US011064376B2

(12) United States Patent
Yang et al.

(10) Patent No.: US 11,064,376 B2
(45) Date of Patent: Jul. 13, 2021

(54) RADIO LINK MONITORING AND RADIO LINK FAILURE RECOVERY

(71) Applicant: QUALCOMM incorporated, San Diego, CA (US)

(72) Inventors: Wei Yang, San Diego, CA (US); Jing Jiang, San Diego, CA (US); Linhai He, San Diego, CA (US); Wanshi Chen, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 16/430,733

(22) Filed: Jun. 4, 2019

(65) Prior Publication Data

US 2019/0380052 A1 Dec. 12, 2019

Related U.S. Application Data

(60) Provisional application No. 62/682,807, filed on Jun. 8, 2018.

(51) Int. Cl.
*H04W 24/08* (2009.01)
*H04L 5/00* (2006.01)
*H04W 72/04* (2009.01)

(52) U.S. Cl.
CPC ............. *H04W 24/08* (2013.01); *H04L 5/001* (2013.01); *H04W 72/042* (2013.01)

(58) Field of Classification Search
CPC ... H04W 24/08; H04W 72/042; H04W 24/10; H04W 36/305; H04L 5/001;
(Continued)

(56) References Cited

U.S. PATENT DOCUMENTS

2015/0146674 A1* 5/2015 Krishnamurthy ... H04W 56/001
370/329
2019/0320482 A1* 10/2019 Hu .................... H04W 80/02
2019/0373663 A1* 12/2019 Yu .................... H04W 72/0493

FOREIGN PATENT DOCUMENTS

CN 107889133 A 4/2018
WO WO-2018082521 A1 5/2018

OTHER PUBLICATIONS

Ericsson: "On initial access, RRM, Mobility and RLM", 3GPP Draft; R1-1806254 on initial access, RRM, Mobility and RLM, 3rd Generation Partnership Project (3GPP), Mobile Competence Centre, 650, Route Des Lucioles, F-06921 Sophia-Antipolis Cedex, France, vol. RAN WG1, No. Busan, Korea; May 21, 2018-May 25, 2018, May 20, 2018, XP051441462, 8 Pages, Retrieved from the Internet: URL:http://www.3gpp.org/ftp/Meetings%205F3GPP%5FSYNC/RAN1/Docs/ [retrieved on May 20, 2018], Section 2.4, 8 pages, Section 2.2.2, Section 2.2.3, Section 1.

(Continued)

*Primary Examiner* — Afshawn M Towfighi
(74) *Attorney, Agent, or Firm* — Holland & Hart LLP/Qualcomm

(57) ABSTRACT

Methods, systems, and devices for wireless communications are described. A base station may transmit, to a user equipment (UE), a configuration of a radio link monitoring resource for a radio link that transports downlink traffic for a first type of service, the first type of service having a higher reliability specification and a lower latency specification than a second type of service offered by the base station. The UE may receive the configuration, and detect that the radio link satisfies a failure condition for the first type of service based on monitoring the RLM resource. The UE may transmit a radio link failure (RLF) indication for the first type of service to the base station based on detecting that the radio link satisfies the failure condition for the first type of (Continued)

service. The base station may receive the RLF from the UE, and transmit an RLF response to the UE.

29 Claims, 20 Drawing Sheets

(58) Field of Classification Search
CPC ..... H04L 5/0053; H04L 5/0048; H04L 1/203; H04L 43/0823
See application file for complete search history.

(56) References Cited

OTHER PUBLICATIONS

Motorola Mobility., et al., "Beam Recovery and Radio Link Monitoring", R1-1716640, Beam Recovery and Radio Link Monitoring, 3rd Generation Partnership Project (3GPP), Mobile Competence Centre, 650, Route Des Lucioles, F-06921 Sophia-Antipolis Cedex, France, vol. RAN WG1, No. Nagoya, Japan; Sep. 18, 2017-Sep. 21, 2017 Sep. 17, 2017, XP051340090, Retrieved from the Internet: URL:http://www.3gpp.org/ftp/Meetings_3GPP_SYNC/RAN1/Docs/ [retrieved on Sep. 17, 2017] Section 1, 4 pages.
Partial International Search Report—PCT/US2019/035632—ISA/EPO—dated Jul. 26, 2019.
International Search Report and Written Opinion—PCT/US2019/035632—ISA/EPO—dated Sep. 20, 2019.

* cited by examiner

RADIO LINK MONITORING AND RADIO LINK FAILURE RECOVERY

CROSS REFERENCES

The present application for patent claims priority to U.S. Patent Application No. 62/682,807 by Yang et al., entitled "Radio Link Monitoring and Radio Link Failure Recovery," filed Jun. 8, 2018, assigned to the assignee hereof and expressly incorporated herein.

BACKGROUND

The following relates generally to wireless communications, and more specifically to radio link monitoring (RLM) and radio link failure (RLF) recovery.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

A base station in some Long Term Evolution (LTE) or New Radio (NR) deployments may transmit to one or more UEs using different length transmission time intervals (TTIs) that may be reduced in length relative to legacy LTE TTIs. Such a reduced length TTI may be referred to as a shortened TTI (sTTI) and may support services that provide low latency with high reliability for wireless transmissions, including ultra-reliable low latency communication (URLLC) services. NR deployments may also support other types of communication services, such as enhanced mobile broadband (eMBB) that permit transmission at higher data rates than available in LTE. Wireless communications systems typically involve communication between different types of devices over a noisy channel. At times a radio link established between two devices, such as between a base station and a UE, may fail. Conventional wireless systems have established processes for monitoring radio link resources for identifying and recovering from a radio link failure. Such monitoring and recovery techniques are deficient for certain types of services.

SUMMARY

The described techniques relate to improved methods, systems, devices, and apparatuses that support radio link monitoring (RLM) and radio link failure (RLF) recovery. Generally, the described techniques provide for detecting that a radio link satisfies a failure condition for a particular type of service to enable mitigation of a radio link failure (RLF). In some examples, RLF may be detected and result from stringent reliability and/or latency specifications for a particular type of service, such as an ultra-reliable low latency communication (URLLC) service. For example, a user equipment (UE) may measure a set of one or more parameters for a reference signal received within a radio link monitoring resource, and may calculate a block error rate (BLER) based on the set of measured parameters. The UE may detect that the radio link satisfies a failure condition, such as if the BLER exceeds a BLER target. The radio link, however, may be satisfactory for other types of services, such as an enhanced mobile broadband (eMBB) service, that have a more lenient BLER target.

Upon detection of RLF for a URLLC service, for example, rather than having a UE perform a lengthy cell re-selection procedure to search for a new cell, the UE may transmit an RLF indication to the base station. In response, the base station may allocate a new resource for the radio link, modify one or more communication parameters for transmissions communicated via the radio link, modify a number of repetitions of transmissions communicated via the radio link, or the like, to improve the reliability for the radio link. In some examples, the base station may, instead or in addition to the UE, identify RLF. The base station may transmit an RLF indication to the UE and may also allocate a new resource, modify one or more communication parameters, use repetition, or the like, to improve the reliability for the radio link. Beneficially, the techniques described herein may reduce latency by reducing instances when the UE performs cell re-selection and, thus, improve the overall quality of service.

A method of wireless communication at a UE is described. The method may include receiving, from a base station, a configuration of at least one RLM resource for a radio link that transports downlink traffic for a first type of service, the first type of service having a higher reliability specification and a lower latency specification than a second type of service offered by the base station, detecting that the radio link satisfies a failure condition for the first type of service based on monitoring the at least one RLM resource, and transmitting an RLF indication for the first type of service to the base station based on detecting that the radio link satisfies the failure condition for the first type of service.

An apparatus for wireless communication at a UE is described. The apparatus may include a processor, memory in electronic communication with the processor, and instructions stored in the memory. The instructions may be executable by the processor to cause the apparatus to receive, from a base station, a configuration of at least one RLM resource for a radio link that transports downlink traffic for a first type of service, the first type of service having a higher reliability specification and a lower latency specification than a second type of service offered by the base station, detect that the radio link satisfies a failure condition for the first type of service based on monitoring the at least one RLM resource, and transmit an RLF indication for the first type of service to the base station based on detecting that the radio link satisfies the failure condition for the first type of service.

Another apparatus for wireless communication at a UE is described. The apparatus may include means for receiving, from a base station, a configuration of at least one RLM resource for a radio link that transports downlink traffic for a first type of service, the first type of service having a higher reliability specification and a lower latency specification than a second type of service offered by the base station, detecting that the radio link satisfies a failure condition for the first type of service based on monitoring the at least one RLM resource, and transmitting an RLF indication for the first type of service to the base station based on detecting that the radio link satisfies the failure condition for the first type of service.

A non-transitory computer-readable medium storing code for wireless communication at a UE is described. The code may include instructions executable by a processor to receive, from a base station, a configuration of at least one RLM resource for a radio link that transports downlink traffic for a first type of service, the first type of service having a higher reliability specification and a lower latency specification than a second type of service offered by the base station, detect that the radio link satisfies a failure condition for the first type of service based on monitoring the at least one RLM resource, and transmit an RLF indication for the first type of service to the base station based on detecting that the radio link satisfies the failure condition for the first type of service.

Some examples of the method, apparatuses, and non-transitory computer-readable medium described herein may further include operations, features, means, or instructions for determining a target BLER for an out-of-synchronization indication for a hypothetical physical downlink control channel (PDCCH) based on the configuration, where the radio link may be detected to satisfy the failure condition for the first type of service based on the target BLER.

Some examples of the method, apparatuses, and non-transitory computer-readable medium described herein may further include operations, features, means, or instructions for measuring a set of parameters of a reference signal communicated by the base station via the at least one RLM resource and mapping the set of parameters to a BLER.

In some examples of the method, apparatuses, and non-transitory computer-readable medium described herein, detecting that the radio link satisfies the failure condition for the first type of service further may include operations, features, means, or instructions for detecting that the radio link satisfies the failure condition for the first type of service based on the BLER.

In some examples of the method, apparatuses, and non-transitory computer-readable medium described herein, the set of parameters include at least one of a BLER parameter, a delay spread parameter, a Doppler parameter, a repetition factor parameter, a signal-to-noise ratio (SNR) parameter, a signal-to-noise-plus-interference ratio (SNIR) parameter, or any combination thereof.

In some examples of the method, apparatuses, and non-transitory computer-readable medium described herein, mapping the set of parameters to the BLER further may include operations, features, means, or instructions for predicting a BLER for a future hypothetical PDCCH transmission based on the set of parameters, where the radio link may be detected to satisfy the failure condition for the first type of service based on the predicted BLER.

Some examples of the method, apparatuses, and non-transitory computer-readable medium described herein may further include operations, features, means, or instructions for transmitting a new resource indication requesting a new resource for the radio link based on detecting that the radio link satisfies the failure condition for the first type of service and based on detecting that a quality parameter of the new resource satisfies a quality parameter target.

In some examples of the method, apparatuses, and non-transitory computer-readable medium described herein, the new resource indication indicates a carrier, a beam, a transmission/reception point, a repetition factor, a diversity order, or any combination thereof.

In some examples of the method, apparatuses, and non-transitory computer-readable medium described herein, the first type of service and the second type of service may be provided by the base station or configured on a same component carrier, and where the monitoring the at least one RLM resource further may include operations, features, means, or instructions for monitoring the at least one RLM resource to determine a first parameter for the radio link for the first type of service and monitoring the at least one RLM resource to determine a second parameter for the second type of service.

In some examples of the method, apparatuses, and non-transitory computer-readable medium described herein, the first type of service and the second type of service may be provided by different base stations or configured on a different component carriers, and where monitoring the at least one RLM resource further may include operations, features, means, or instructions for monitoring the at least one RLM resource to determine a first set of parameters for the radio link for the first type of service and monitoring a second RLM resource to determine a second parameter for a second radio link for the second type of service.

In some examples of the method, apparatuses, and non-transitory computer-readable medium described herein, detecting that the radio link satisfies the failure condition for the first type of service further may include operations, features, means, or instructions for determining a hypothetical BLER for an autonomous downlink transmission or a semi-persistently scheduled downlink transmission via a physical downlink shared channel (PDSCH), identifying an out-of-synchronization indication based on the hypothetical BLER and detecting that the radio link satisfies the failure condition for the first type of service based on the out-of-synchronization indication.

Some examples of the method, apparatuses, and non-transitory computer-readable medium described herein may further include operations, features, means, or instructions for receiving a configuration message indicating a failure indication resource, where the RLF indication may be transmitted via the failure indication resource.

In some examples of the method, apparatuses, and non-transitory computer-readable medium described herein, the failure indication resource may be a dedicated physical random access channel (PRACH), a scheduling request (SR) resource, a physical uplink control channel (PUCCH) resource, or a combination thereof.

In some examples of the method, apparatuses, and non-transitory computer-readable medium described herein, transmitting the failure indication for the first type of service further may include operations, features, means, or instructions for transmitting, via a PUSCH associated with the second type of service, a MAC CE including the RLF indication.

In some examples of the method, apparatuses, and non-transitory computer-readable medium described herein, the MAC CE indicates a request for a new resource for the radio link.

Some examples of the method, apparatuses, and non-transitory computer-readable medium described herein may further include operations, features, means, or instructions for receiving a configuration message indicating a set of failure indication resources, where transmitting the RLF indication further includes transmitting the radio link failure indication via a first failure indication resource of the plurality of failure indication resources to request a new resource for the radio link corresponding to the first failure indication resource.

In some examples of the method, apparatuses, and non-transitory computer-readable medium described herein, transmitting the RLF indication further may include operations, features, means, or instructions for transmitting an indicator that indicates a failure type for the radio link from a set of different failure types.

Some examples of the method, apparatuses, and non-transitory computer-readable medium described herein may further include operations, features, means, or instructions for transmitting an in-synchronization indication to indicate that the radio link no longer satisfies the failure condition for the first type of service.

Some examples of the method, apparatuses, and non-transitory computer-readable medium described herein may further include operations, features, means, or instructions for receiving an RLF response based on transmitting the RLF indication.

In some examples of the method, apparatuses, and non-transitory computer-readable medium described herein, the RLF response indicates a change to a carrier, a beam, a transmission/reception point (TRP), or any combination thereof, for the radio link.

In some examples of the method, apparatuses, and non-transitory computer-readable medium described herein, the RLF response configures or schedules the UE to use multiple carriers, multiple beams, multiple TRPs, a repetition pattern, or any combination thereof.

In some examples of the method, apparatuses, and non-transitory computer-readable medium described herein, the RLF response indicates a change to a bandwidth parameter, a modulation and coding scheme (MCS), a repetition pattern parameter, a communication parameter, or any combination thereof, of a semi-persistently scheduled transmission associated with the first type of service.

In some examples of the method, apparatuses, and non-transitory computer-readable medium described herein, the RLF response may be received in downlink control information (DCI) signaling via PDCCH associated with the second type of service or a MAC CE via a PDSCH associated with the second type of service.

In some examples of the method, apparatuses, and non-transitory computer-readable medium described herein, the RLF response includes a deactivation indicator indicating that the first type of service may be deactivated.

Some examples of the method, apparatuses, and non-transitory computer-readable medium described herein may further include operations, features, means, or instructions for receiving traffic for the second type of service via the radio link.

Some examples of the method, apparatuses, and non-transitory computer-readable medium described herein may further include operations, features, means, or instructions for detecting that the radio link does not satisfy a second failure condition for the second type of service within a time period in which the radio link satisfies the failure condition for the first type of service.

In some examples of the method, apparatuses, and non-transitory computer-readable medium described herein, the at least one RLM resource may be a carrier, a beam, a TRP, or any combination thereof.

Some examples of the method, apparatuses, and non-transitory computer-readable medium described herein may further include operations, features, means, or instructions for receiving DCI via the at least one RLM resource.

In some examples of the method, apparatuses, and non-transitory computer-readable medium described herein, the first type of service may be a URLLC service and the second type of service may be an eMBB service.

In some examples of the method, apparatuses, and non-transitory computer-readable medium described herein, a first monitoring periodicity of the at least one RLM resource associated with the first type of service may be shorter than a second monitoring periodicity of an RLM resource associated with the second type of service.

A method of wireless communication at a base station is described. The method may include transmitting, to a UE, a configuration of at least one RLM resource for a radio link that transports downlink traffic for a first type of service, the first type of service having a higher reliability specification and a lower latency specification than a second type of service offered by the base station, receiving an RLF indication from the UE indicating that the radio link satisfies a failure condition for the first type of service, and transmitting an RLF response to the UE based on the RLF indication.

An apparatus for wireless communication at a base station is described. The apparatus may include a processor, memory in electronic communication with the processor, and instructions stored in the memory. The instructions may be executable by the processor to cause the apparatus to transmit, to a UE, a configuration of at least one RLM resource for a radio link that transports downlink traffic for a first type of service, the first type of service having a higher reliability specification and a lower latency specification than a second type of service offered by the base station, receive an RLF indication from the UE indicating that the radio link satisfies a failure condition for the first type of service, and transmit an RLF response to the UE based on the RLF indication.

Another apparatus for wireless communication at a base station is described. The apparatus may include means for transmitting, to a UE, a configuration of at least one RLM resource for a radio link that transports downlink traffic for a first type of service, the first type of service having a higher reliability specification and a lower latency specification than a second type of service offered by the base station, receiving an RLF indication from the UE indicating that the radio link satisfies a failure condition for the first type of service, and transmitting an RLF response to the UE based on the RLF indication.

A non-transitory computer-readable medium storing code for wireless communication at a base station is described. The code may include instructions executable by a processor to transmit, to a UE, a configuration of at least one RLM resource for a radio link that transports downlink traffic for a first type of service, the first type of service having a higher reliability specification and a lower latency specification than a second type of service offered by the base station, receive an RLF indication from the UE indicating that the radio link satisfies a failure condition for the first type of service, and transmit an RLF response to the UE based on the RLF indication.

Some examples of the method, apparatuses, and non-transitory computer-readable medium described herein may further include operations, features, means, or instructions for transmitting a configuration message indicating a failure indication resource, where the RLF indication may be received via the failure indication resource.

In some examples of the method, apparatuses, and non-transitory computer-readable medium described herein, the failure indication resource may be a dedicated PRACH, an SR resource, a PUCCH resource, or a combination thereof.

In some examples of the method, apparatuses, and non-transitory computer-readable medium described herein, receiving the RLF indication further may include operations, features, means, or instructions for receiving, via PUSCH of the second type of service, a MAC CE including the RLF indication.

In some examples of the method, apparatuses, and non-transitory computer-readable medium described herein, the MAC CE indicates a request for a new resource for the radio link.

Some examples of the method, apparatuses, and non-transitory computer-readable medium described herein may further include operations, features, means, or instructions for receiving a new resource indication requesting a new resource for the radio link and determining the new resource based on the new resource indication.

In some examples of the method, apparatuses, and non-transitory computer-readable medium described herein, the new resource indication indicates a carrier, or a beam, a transmission/reception point, or any combination thereof.

Some examples of the method, apparatuses, and non-transitory computer-readable medium described herein may further include operations, features, means, or instructions for transmitting a configuration message indicating a set of failure indication resources, where receiving the RLF indication further includes.

In some examples of the method, apparatuses, and non-transitory computer-readable medium described herein, receiving the RLF indication further may include operations, features, means, or instructions for receiving an indicator that indicates a failure type for the radio link from a set of different failure types.

Some examples of the method, apparatuses, and non-transitory computer-readable medium described herein may further include operations, features, means, or instructions for receiving an in-synchronization indication to indicate that the radio link no longer satisfies the failure condition for the first type of service.

In some examples of the method, apparatuses, and non-transitory computer-readable medium described herein, the RLF response indicates a change to a carrier, a beam, a TRP, or any combination thereof, for the radio link.

In some examples of the method, apparatuses, and non-transitory computer-readable medium described herein, the RLF response indicates a change to a bandwidth parameter, a modulation and coding scheme, a repetition pattern parameter, a communication parameter, or any combination thereof, of a semi-persistently scheduled transmission associated with the first type of service.

In some examples of the method, apparatuses, and non-transitory computer-readable medium described herein, the RLF response configures or schedules the UE to use multiple carriers, multiple beams, multiple TRPs, a repetition pattern, or any combination thereof.

In some examples of the method, apparatuses, and non-transitory computer-readable medium described herein, the RLF response may be transmitted in DCI signaling or a MAC CE.

In some examples of the method, apparatuses, and non-transitory computer-readable medium described herein, the RLF response includes a deactivation indicator indicating that the first type of service may be deactivated.

Some examples of the method, apparatuses, and non-transitory computer-readable medium described herein may further include operations, features, means, or instructions for transmitting DCI associated with the first type of service via the at least one RLM resource.

In some examples of the method, apparatuses, and non-transitory computer-readable medium described herein, the first type of service may be a URLLC service and the second type of service may be an eMBB service.

In some examples of the method, apparatuses, and non-transitory computer-readable medium described herein, a first monitoring periodicity of the at least one RLM resource associated with the first type of service may be shorter than a second monitoring periodicity of an RLM resource associated with the second type of service.

A method of wireless communication at a UE is described. The method may include transmitting uplink traffic for a first type of service to a base station via a radio uplink, the first type of service having a higher reliability specification and a lower latency specification than a second type of service offered by the base station, receiving an RLF indication indicating that the radio uplink satisfies a failure condition for the first type of service, and transmitting the uplink traffic for the first type of service via at least one new resource indicated to be activated by the RLF indication.

An apparatus for wireless communication at a UE is described. The apparatus may include a processor, memory in electronic communication with the processor, and instructions stored in the memory. The instructions may be executable by the processor to cause the apparatus to transmit uplink traffic for a first type of service to a base station via a radio uplink, the first type of service having a higher reliability specification and a lower latency specification than a second type of service offered by the base station, receive an RLF indication indicating that the radio uplink satisfies a failure condition for the first type of service, and transmit the uplink traffic for the first type of service via at least one new resource indicated to be activated by the RLF indication.

Another apparatus for wireless communication at a UE is described. The apparatus may include means for transmitting uplink traffic for a first type of service to a base station via a radio uplink, the first type of service having a higher reliability specification and a lower latency specification than a second type of service offered by the base station, receiving an RLF indication indicating that the radio uplink satisfies a failure condition for the first type of service, and transmitting the uplink traffic for the first type of service via at least one new resource indicated to be activated by the RLF indication.

A non-transitory computer-readable medium storing code for wireless communication at a UE is described. The code may include instructions executable by a processor to transmit uplink traffic for a first type of service to a base station via a radio uplink, the first type of service having a higher reliability specification and a lower latency specification than a second type of service offered by the base station, receive an RLF indication indicating that the radio uplink satisfies a failure condition for the first type of service, and transmit the uplink traffic for the first type of service via at least one new resource indicated to be activated by the RLF indication.

Some examples of the method, apparatuses, and non-transitory computer-readable medium described herein may further include operations, features, means, or instructions for identifying that the radio uplink satisfies the failure condition for the first type of service based on determining that a defined number of SRs may have been transmitted to the base station without receiving an uplink grant for transmitting the uplink traffic and transmitting, to the base station, a second RLF indication based on identifying that the radio uplink satisfies the failure condition.

Some examples of the method, apparatuses, and non-transitory computer-readable medium described herein may further include operations, features, means, or instructions for receiving, from the base station, a configuration of at least one reference signal for the radio uplink.

Some examples of the method, apparatuses, and non-transitory computer-readable medium described herein may further include operations, features, means, or instructions for transmitting a reference signal to the base station.

In some examples of the method, apparatuses, and non-transitory computer-readable medium described herein, the RLF indication may be received in DCI signaling via a PDCCH or a MAC CE via a PDSCH.

In some examples of the method, apparatuses, and non-transitory computer-readable medium described herein, the RLF indication indicates at least one parameter.

Some examples of the method, apparatuses, and non-transitory computer-readable medium described herein may further include operations, features, means, or instructions for jointly decoding the RLF indication to obtain at least one parameter and a transmit power command.

In some examples of the method, apparatuses, and non-transitory computer-readable medium described herein, the at least one new resource may be an additional resource for an SR, a repetition factor for an uplink control channel, a dedicated resource for uplink control channel repetition, or any combination thereof.

In some examples of the method, apparatuses, and non-transitory computer-readable medium described herein, the first type of service may be a URLLC and the second type of service may be an eMBB service.

A method of wireless communication at a base station is described. The method may include monitoring at least one reference signal for a radio link that transports uplink traffic for a first type of service from a UE, the first type of service having a higher reliability specification and a lower latency specification than a second type of service offered by the base station, detecting that the radio uplink satisfies a failure condition for the first type of service based on monitoring the at least one reference signal, and transmitting an RLF indication for the first type of service to the UE based on detecting that the radio link satisfies the failure condition for the first type of service.

An apparatus for wireless communication at a base station is described. The apparatus may include a processor, memory in electronic communication with the processor, and instructions stored in the memory. The instructions may be executable by the processor to cause the apparatus to monitor at least one reference signal for a radio link that transports uplink traffic for a first type of service from a UE, the first type of service having a higher reliability specification and a lower latency specification than a second type of service offered by the base station, detect that the radio uplink satisfies a failure condition for the first type of service based on monitoring the at least one reference signal, and transmit an RLF indication for the first type of service to the UE based on detecting that the radio link satisfies the failure condition for the first type of service.

Another apparatus for wireless communication at a base station is described. The apparatus may include means for monitoring at least one reference signal for a radio link that transports uplink traffic for a first type of service from a UE, the first type of service having a higher reliability specification and a lower latency specification than a second type of service offered by the base station, detecting that the radio uplink satisfies a failure condition for the first type of service based on monitoring the at least one reference signal, and transmitting an RLF indication for the first type of service to the UE based on detecting that the radio link satisfies the failure condition for the first type of service.

A non-transitory computer-readable medium storing code for wireless communication at a base station is described. The code may include instructions executable by a processor to monitor at least one reference signal for a radio link that transports uplink traffic for a first type of service from a UE, the first type of service having a higher reliability specification and a lower latency specification than a second type of service offered by the base station, detect that the radio uplink satisfies a failure condition for the first type of service based on monitoring the at least one reference signal, and transmit an RLF indication for the first type of service to the UE based on detecting that the radio link satisfies the failure condition for the first type of service.

In some examples of the method, apparatuses, and non-transitory computer-readable medium described herein, detecting that the radio link satisfies the failure condition for the first type of service further may include operations, features, means, or instructions for measuring a parameter of a reference signal communicated by the UE and mapping the measured parameter to a BLER, where the radio link may be detected to satisfy the failure condition for the first type of service based on the BLER.

In some examples of the method, apparatuses, and non-transitory computer-readable medium described herein, the measured parameter may be an SNR or an SNIR.

In some examples of the method, apparatuses, and non-transitory computer-readable medium described herein, the RLF indication may be transmitted in DCI signaling via a PDCCH or a MAC CE via a PDSCH.

In some examples of the method, apparatuses, and non-transitory computer-readable medium described herein, the RLF indication indicates at least one parameter.

Some examples of the method, apparatuses, and non-transitory computer-readable medium described herein may further include operations, features, means, or instructions for generating the RLF indication based on jointly encoding at least one parameter with a transmit power command.

In some examples of the method, apparatuses, and non-transitory computer-readable medium described herein, the RLF indication indicates activation of at least one resource.

In some examples of the method, apparatuses, and non-transitory computer-readable medium described herein, the at least one resource may be an additional resource for an SR, a change to a repetition factor for an uplink control channel, a dedicated uplink resource with repetition, or any combination thereof.

In some examples of the method, apparatuses, and non-transitory computer-readable medium described herein, the first type of service may be a URLLC service and the second type of service may be an eMBB service.

In some examples of the method, apparatuses, and non-transitory computer-readable medium described herein, a first monitoring periodicity of the at least one RLM resource associated with the first type of service may be shorter than a second monitoring periodicity of an RLM resource associated with the second type of service.

DETAILED DESCRIPTION

Figure 1:
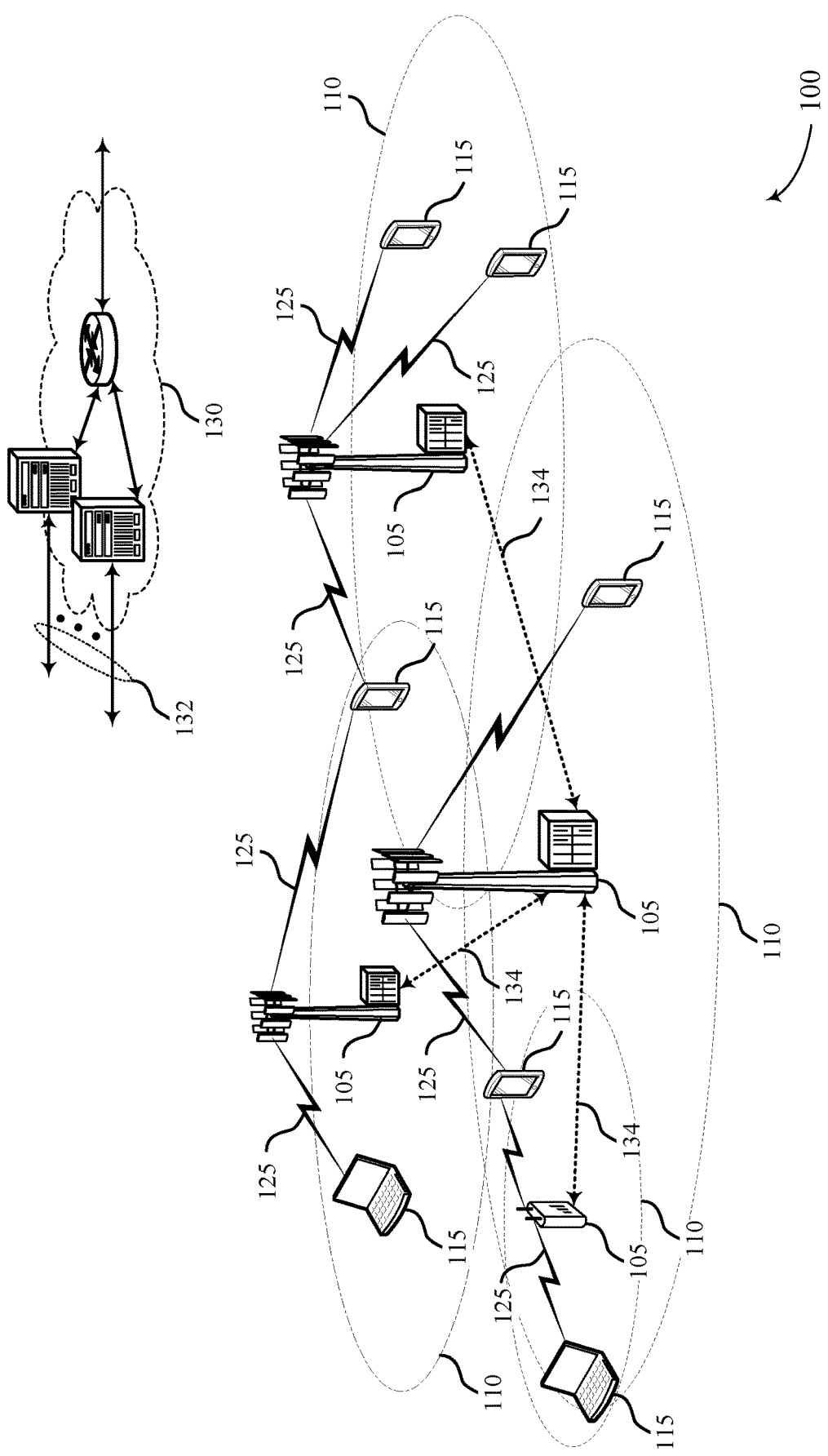
FIG. 1 illustrates an example of a system for wireless communications that supports radio link monitoring (RLM) and radio link failure (RLF) recovery in accordance with aspects of the present disclosure.

The described techniques relate to improved methods, systems, devices, or apparatuses that support radio link monitoring and radio link failure recovery. Generally, the described techniques provide for detecting that a radio link satisfies a failure condition for a particular type of service to enable a serving base station to manage and mitigate radio link failure (RLF). In some examples, RLF may be detected and result from stringent reliability and/or latency specifications for a type of service, such as an ultra-reliable low latency communication (URLLC) service. Beneficially, the techniques described herein may reduce latency by reducing instances when the UE performs cell re-selection.

When establishing a radio link, a base station may configure a user equipment (UE) with at least one radio link monitoring (RLM) resource associated with a service, such as a URLLC service or an eMBB service. The radio link may support multiple connections, with each connection associated with a respective service. The base station may transmit at least one reference signal within the at least one RLM resource, and the UE may monitor the at least one RLM resource for the reference signal. The UE may measure a set of one or more parameters, including, for example, a signal to noise ratio (SNR), for the reference signal. The UE may map the set of parameters to a block error rate (BLER), and may determine whether the radio link satisfies a failure condition, such as if the BLER exceeds a BLER target. In some examples, the radio link, however, may be satisfactory for other types of services, such as an enhanced mobile broadband (eMBB) service, that have a more lenient BLER target. For example, a URLLC service may have a BLER target of 1% error rate, and an eMBB service may have a BLER target of a 10% error rate. The UE may, for example, detect RLF for the URLLC service at a 2% error rate, but may not for the eMBB service.

Rather than having the UE perform a lengthy cell re-selection procedure upon detection of RLF for a particular service, the UE may transmit an RLF indication corresponding to the service to a serving base station. In reply, the serving base station may attempt to mitigate the RLF. In some cases, the serving base station may allocate a new resource for the radio link, modify one or more communication parameters of transmissions communicated via the radio link, modify a number of repetitions of transmissions communicated via the radio link, or the like, to improve the reliability for the radio link. In some examples, the base station may, instead or in addition to the UE, identify the RLF. The base station may transmit an RLF indication for the service to the UE and may also attempt to mitigate the RLF.

Aspects of the disclosure are initially described in the context of a wireless communications system. The described techniques provide for detecting that a radio link satisfies a failure condition for a particular type of service to enable a serving base station to manage and mitigate the RLF. Aspects of the disclosure are further illustrated by and described with reference to apparatus diagrams, system diagrams, and flowcharts that relate to RLM and RLF recovery.

FIG. 1 illustrates an example of a wireless communications system 100 that supports RLM and RLF recovery in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The wireless communication system may implement multiple different types of services, including URLLC service and eMBB service. In NR, URLLC service may expected to meet stringent reliability and latency specifications. In some cases, the expected reliability may be an error rate of no more than $1e^{-5}$ to $1e^{-4}$ within a 1 millisecond end-to-end latency bound. For eMBB radio link monitoring (RLM), UE 115 monitors received SNR of a reference signal, such as a synchronization signal block (SSB) or a channel state information reference signal (CSI-RS), determines a set of parameters from the reference signal, and maps a set of measured parameters for the reference signal, including, for example, a signal to noise ratio (SNR), to a block error rate (BLER). In some examples, calculation of the BLER may not be sensitive to diversity order (e.g., around a $1e^{-1}$ BLER target). A diversity order may refer to an amount of repetition of a transmission for which a BLER is being calculated, and may be a function of frequency (e.g., different carriers), time, beam, transmission/receipt point, or the like.

Conventionally, a base station configures a UE with RLM reference signal (RLM RS) resources, and a UE monitors one or more reference signals communicated by the base station in the configured RLM-RS resources. The reference signals may be one or more of a SSB, a CSI-RS, or the like. In some examples, the base station may configure a UE with one of two pairs of out-of-sync and in-sync BLER targets for a control channel (e.g., a PDCCH). For example, the UE 115 may store a table similar to that provided below.

TABLE

| Configuration | $BLER_{out}$ | $BLER_{in}$ |
|---|---|---|
| 0 | 10% | 2% |
| 1 | undefined | undefined |

Configuration 0 may specify out-of-sync and in-sync BLER targets for eMBB service, and Configuration 1 may specify out-of-sync and in-sync BLER targets for other services (e.g., URLLC). Specific out-of-sync and in-sync BLER targets for Configuration 1 have not yet been defined in NR. In some instances, a restriction may be placed on the UE, where the UE may be limited to being configured with a single pair of BLER targets at a time.

To perform RLM, a UE may monitor one or more reference signals to calculate a hypothetical BLER for a control channel (e.g., a PDCCH). In some examples, as part of the hypothetical BLER calculation, a UE may assume that a control channel is transmitted at a higher power level than a reference signal, and may factor in the higher power level when calculating the BLER. For example, the UE may assume an additional power boost for PDCCH as compared to SSB SNR, CSI-RS SNR, or the like, and may add an SNR offset, for example, to the measured SNR. The UE may use the hypothetical BLER for PDCCH to determine whether a UE is in-synchronization or out-of-synchronization with a serving base station. The UE may determine that it is in-sync if the calculated BLER is less than or equal to $BLER_{in}$ and that it is out-of-sync if the calculated BLER is larger than or equal to $BLER_{out}$. Based on the determination, the UE may periodically, or at least occasionally, send an in-sync (IS) indication or an out-of-sync (OOS) indication from a physical layer (e.g., L1) to a higher layer (e.g., L2 or higher) of the UE. Conventionally, the UE does not send L1 or L2 signaling of IS and/or OOS indications to a serving base station (e.g., a gNB).

Conventionally, the UE may trigger RLF by the following events: downlink (DL) RLM triggered RLF, a random access problem indication from master cell group (MCG) MAC, or MCG radio link control (RLC) indicating that a maximum max number of retransmission has been reached. Upon triggering RLF, the UE performs cell reselection procedure to recover from RLF. In cell re-selection, the UE searches for and measures signal quality for a set of neighboring base states, and attempts to attach to one of the neighbor base stations. For example, the UE may use a random access procedure, such as a random access channel (RACH) procedure, attempting to attach to a new base station. During the cell reselection procedure, the UE is not receiving traffic of a service, and hence may induce latency and degrade a user experience. For example, such a cell reselection procedure may introduce a latency of 100 ms~1 s in a conventional system.

When performing RLM for URLLC, diversity is a factor for achieving a low BLER (e.g., $1e^{-5}$), and mapping of SNR to BLER is impacted by diversity. Moreover, diversity for a control channel (e.g., PDCCH) and a reference signal (e.g., SSB, CSI-RS, etc.) may be very different.

In wireless communication system 100, the techniques described herein provide examples of PDCCH communication assumptions that the UE 115 may make when computing a hypothetical BLER target. In some cases, a given physical layer link quality between a UE 115 and base station 105 (e.g., gNB) may be sufficient for an eMBB service, but not sufficient to support a URLLC service. That is, UE may experience and detect an URLLC RLF, while the radio link remains satisfactory for eMBB service. Moreover, the examples described herein provide for the UE 115 to report RLF for a URLLC service, and describes operations at base station 105 that may be used to help the UE 115 recover from URLLC RLF.

In some examples, base station 105 and UE 115 may establish a radio link supporting multiple connections, including a connection for a URLLC service and for an eMBB service. The base station 105 may, for example, transmit downlink traffic to the UE 115 for the URLLC service, the eMBB service, one or more additional services, or any combination thereof. The examples herein describe a URLLC service and an eMBB service, and may be extended to any number of services.

In an example, base station 105 may transmit, to UE 115, a configuration of at least one RLM resource for a radio link that transports downlink traffic for a first type of service (e.g., URLLC service), the first type of service having a higher reliability specification and a lower latency specification than a second type of service offered by the base station 105. The UE 115 may receive the configuration, and detect that the radio link satisfies a failure condition for the first type of service based on monitoring the at least one RLM resource. The UE 115 may transmit an RLF indication for the first type of service to the base station 105 based on detecting that the radio link satisfies the failure condition for the first type of service. The base station 105 may receive the RLF from the UE 115, and transmit an RLF response to the UE 115 to mitigate the RLF.

In some examples, UE 115 may transmit uplink traffic for a first type of service (e.g., URLLC service) to base station 105 via a radio uplink, the first type of service having a higher reliability specification and a lower latency specification than a second type of service offered by the base station. The base station 105 may monitor at least one reference signal for the radio uplink and may detect that the radio link satisfies a failure condition for the first type of service. The base station 105 may transmit an RLF indication for the first type of service to the UE 115 and may transmit an RLF response to the UE 115 to mitigate the RLF.

Figure 2:
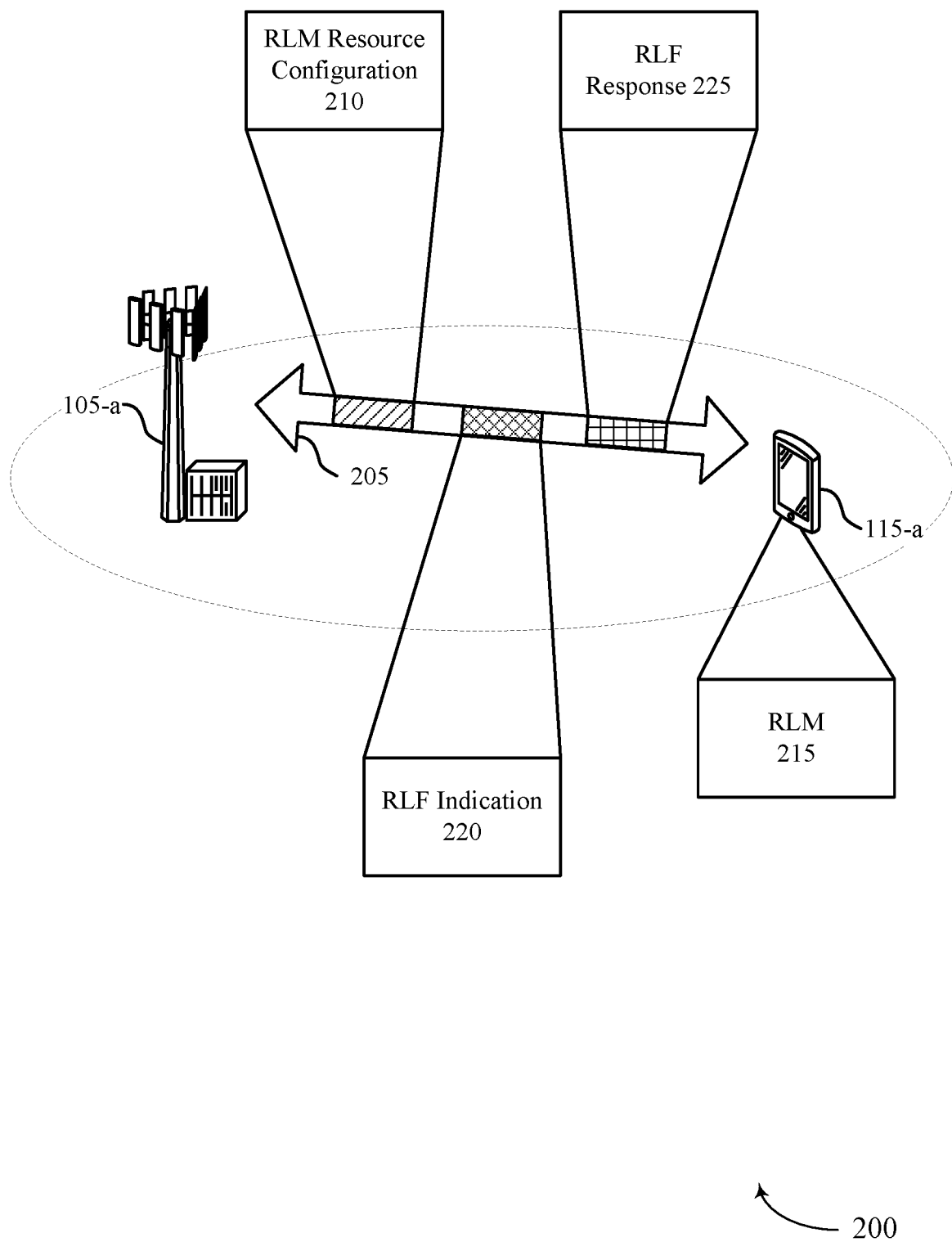
FIG. 2 illustrates an example of a wireless communications system that supports RLM and RLF recovery in accordance with aspects of the present disclosure.

FIG. 2 illustrates an example of a wireless communications system 200 that supports RLM and RLF recovery in accordance with aspects of the present disclosure. In some examples, wireless communications system 200 may implement aspects of wireless communications system 100. Wireless communications system 200 may include a base station 105-a and a UE 115-a, which may be examples of corresponding base stations 105 and UEs 115 as described herein with reference to FIG. 1. In some cases, base station 105-a and UE 115-a may communicate on resources of at least one carrier 205 according to a first type of service (e.g., URLLC) and/or a second type of service (e.g., eMBB), where the first type of service includes higher reliability and lower latency specifications (e.g., requirements) for associated communications than the second type of service. Accordingly, UE 115-a may be configured to perform RLM for the first type of service and/or the second type of service, where the first type of service and the second type of service are provided by base station 105-a or configured on a same bandwidth part or a same component carrier. Alternatively, the first type of service and the second type of service may be provided by different base stations 105 or configured on different bandwidth parts or different component carriers.

Initially, base station 105-a may transmit an RLM resource configuration 210 to UE 115-a for the first type of service. In some cases, a smaller RLM periodicity may be configured for the first type of service compared to the periodicity of the second type of service. In some examples, more than one RLM resource may be configured for the UE to monitor for the first type of service. Alternatively or additionally, UE 115-a may receive downlink control information (DCI) on part of RLM resources indicated in configuration 210, and UE 115-a may need to monitor some additional (e.g., back-up) resources. As such, if a current serving resource for the RLM fails, UE 115-a may switch to one of the other resources that UE 115-a monitors. In some cases, RLM resource configuration 210 may include a configuration for RLM resources for both the first type of service and the second type of service, where the RLM resources may be the same or different for both service types. The examples described herein refer to first and second types of services, and may be extended to any number of services. Base station 105-a may transmit RLM resource configuration 210 over higher layer signaling (e.g., RRC signaling).

Based on RLM resource configuration 210, UE 115-a may perform RLM 215 on the indicated resources for the first type of service, the second type of service, or both. In some cases, RLM 215 may include calculating a hypothetical BLER over the indicated resources, and the UE 115-a may compare the calculated hypothetical BLER to a BLER target for determining whether RLF has occurred. In some cases, the hypothetical BLER target may be used to identify an out-of-synchronization condition for a downlink control channel, and the hypothetical BLER target may be different for the first type of service than the second type of service. For example, a PDCCH hypothetical BLER target for an out-of-synchronization indication may be smaller for the first type of service (e.g., 1%-0.01%) as opposed to a PDCCH hypothetical BLER target for an out-of-synchronization indication for the second type of service (e.g., 10%). Additionally, the BLER target may depend on a numerology for the communications and whether the communications are grant-based (e.g., triggered by a PDCCH) or are grant-free (e.g., PDCCH activated). For the numerology with a higher subcarrier spacing (SCS), base station 105-a may be able to send more downlink control channels (e.g., PDCCHs) within a latency budget for the type of service. In this case, the hypothetical BLER target may be larger. In other cases, there may be a greater number of opportunities using grant-free communication than opportunities using grant-based communication within the same latency budget for the type of service. As a result, the BLER target for grant-based communications may be smaller than the BLER for grant-free communications. In addition, reliability requirements associated with each grant-free communication opportunity may be lower than reliability requirements associated with each grant-based communication opportunity. The reliability requirements may be configured in some cases to achieve a same latency and reliability target for each communication opportunity.

UE 115-a may calculate the BLER for a downlink control channel (e.g., PDCCH), where the downlink control channel may include a configuration that uses DCI associated with the first type of service (e.g., if a different DCI format is configured for the first type of service), uses a different aggregation level (e.g., aggregation level (AL)=16) than the second type of service, and control channel repetition may be assumed for the downlink control channel (e.g., repetitions of control channel transmissions may be in accordance with a repetition factor). In some cases, the repetition factor may be over frequency (e.g., different carriers), time, beam, TRP, etc. As such, the repetition factor may result in different diversity orders for the downlink control channel.

As described herein, base station 105-a may configure multiple physical resources for UE 115-a to monitor link quality in order to help UE 115-a recover from an RLF (e.g., as soon as possible) and to help UE 115-a calculate the hypothetical BLER target. For example, the multiple physical resources may include different carriers, different beams, different TRPs, etc. Accordingly, each physical resource (e.g., carrier, beam, TRP, etc.) may correspond to a separate reference signal (e.g., separate synchronization signal (SS) block, separate channel state information reference signal (CSI-RSs), or the like) for UE 115-a to perform RLM 215. Additionally, base station 105-a may configure UE 115-a with which resources to use for the hypothetical BLER calculation on the downlink control channel (e.g., PDCCH BLER calculation).

When a link for the first type of service is activated (e.g., in use), UE 115-a may perform RLM 215 for both the first type of service and the second type of service. In some cases, both types of services may be configured on a same cell, bandwidth part, or component carrier. Accordingly, UE 115-a may perform two RLM 215 operations on the same cell, bandwidth part, component carrier, or any combination thereof. Alternatively or additionally, the two types of services may be configured on different cells, bandwidth parts, or component carriers, and, as such, UE 115-a may follow specific RLM 215 operations on the corresponding cells, bandwidth parts, component carriers, or combination thereof, for each type of service. For example, if the first type of service is transmitted on a cell A, and the second type of service is transmitted on a cell B, then UE 115-a may perform RLM operations for the first type of service on cell A and may perform RLM operations for the second type of service on cell B.

In some cases, communications according to the first type of service may be based on semi-persistent scheduling (SPS), autonomous (e.g., grant-free) transmissions (e.g., uplink or downlink transmissions). As such, a quality of the downlink control channel may not be critical, and UE 115-a may calculate the BLER for a hypothetical grant-free downlink shared channel (e.g., physical downlink shared channel (PDSCH)) to determine an out-of-synchronization indication, in a manner similar to that described herein for calculating a hypothetical BLER for a PDCCH. In this case, the base station 105-a may configure UE 115-a reference signals and transmission parameters (e.g., modulation and coding scheme (MCS), spatial parameters, number of transmission layers and spatial precoders, etc.) for a hypothetical grant-free PDSCH for UE 115-a to monitor link quality and to calculate the hypothetical BLER.

In addition to the out-of-synchronization indication, the physical layer operating on UE 115-a may indicate additional parameters to a higher layer (e.g., RRC layer) of UE 115-a for detecting an RLF. For example, an actual hypothetical BLER may be indicated in the additional parameters instead of, or in addition to, an out-of-synchronization or in-synchronization indication. Additionally, the additional parameters may include channel parameters to determine a diversity order of the channel for one or more of the different types of services. For example, the channel parameters may include at least one of a BLER parameter, a delay spread parameter, a Doppler parameter, a repetition factor parameter, a signal-to-noise ratio (SNR) parameter, a signal-to-noise-plus-interference ratio (SNIR) parameter, or any combination thereof. In some cases, the higher layer of UE 115-a may apply certain filters to predict the BLER for future communications on the downlink control channel.

Based on the measurements and calculations performed as part of RLM 215, UE 115 may determine or trigger an RLF and may transmit an RLF indication 220 to base station 105-a. In some cases, UE 115-a may determine the RLF based on the BLER calculation corresponding to an out-of-synchronization indication, or if a defined number of consecutive scheduling requests (SR), uplink transmissions, or the like, are sent without a reply from base station 105-a.

Accordingly, UE 115-*a* may transmit RLF indication 220 to base station 105-*a*. In some examples, base station 105-*a* may detect an RLF based on measurements of a reference signal transmitted by UE 115-*a* (e.g., measurement of a sounding reference signals (SRSs)), and, as such, base station 105-*a* may transmit RLF indication 220 to UE 115-*a*.

After the RLF is triggered, base station 105-*a* may transmit an RLF response 225 to help UE 115-*a* mitigate the RLF. In some cases, if base station 105-*a* detects the RLF, RLF indication 220 and RLF response 225 may be transmitted in a same or different message. RLF response 225 may include configuring UE 115-*a* to switch to a different resource for the first type of service, adjust transmission parameters for downlink channels, deactivate the first type of service, or an additional mitigation procedure.

Figure 3A:
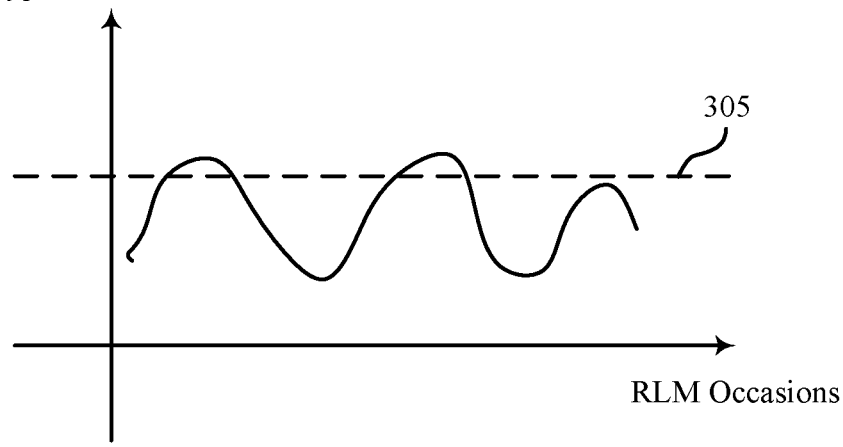
FIGS. 3A and 3B illustrate examples of block error ratio (BLER) predictions that supports RLM and RLF recovery in accordance with aspects of the present disclosure.
Figure 3B:
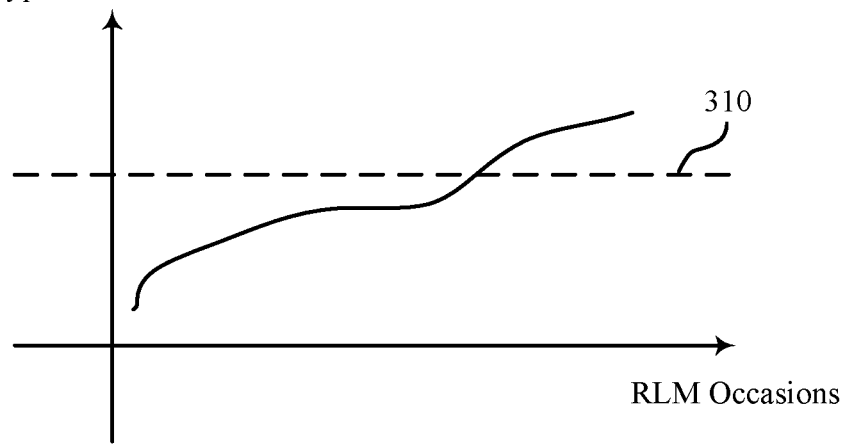

FIGS. 3A and 3B illustrate examples of BLER predictions 300 and 301 that support RLM and RLF recovery in accordance with aspects of the present disclosure. In some examples, BLER predictions 300 and 301 may implement aspects of wireless communications systems 100 and/or 200. As described herein with reference to FIG. 2, a UE 115 may calculate a hypothetical BLER as part of RLM in order to determine if an RLF occurs one or more types of services (e.g., URLLC service, eMBB service, etc.).

In some cases, a high layer of the UE 115 may apply certain filters to predict a hypothetical BLER for future communications on a downlink control channel (e.g., PDCCH). The hypothetical BLERs 305 and 310 may represent different BLER predictions for future communications based on RLM measurements in previous RLM occasions. The UE 115 may utilize the hypothetical BLERs 305 and 310 to determine if an RLF condition is satisfied for future downlink control channel communications. In some examples, the UE 115 may monitor a trend in the hypothetical BLER over time to predict the BLER for future PDCCH communications. For example, the UE 115 may identify a rate of change and direction of change of a hypothetical BLER over time. The UE 115 may use the trend to identify an RLF, or may predict an RLF will occur within a defined amount of time. In some examples, the UE 115 may signal a predicted RLF prior to when an RLF actually detected to occur, and the base station 105 attempt to mitigate the RLF, or prevent the RLF before it occurs, using the techniques described herein.

Figure 4:
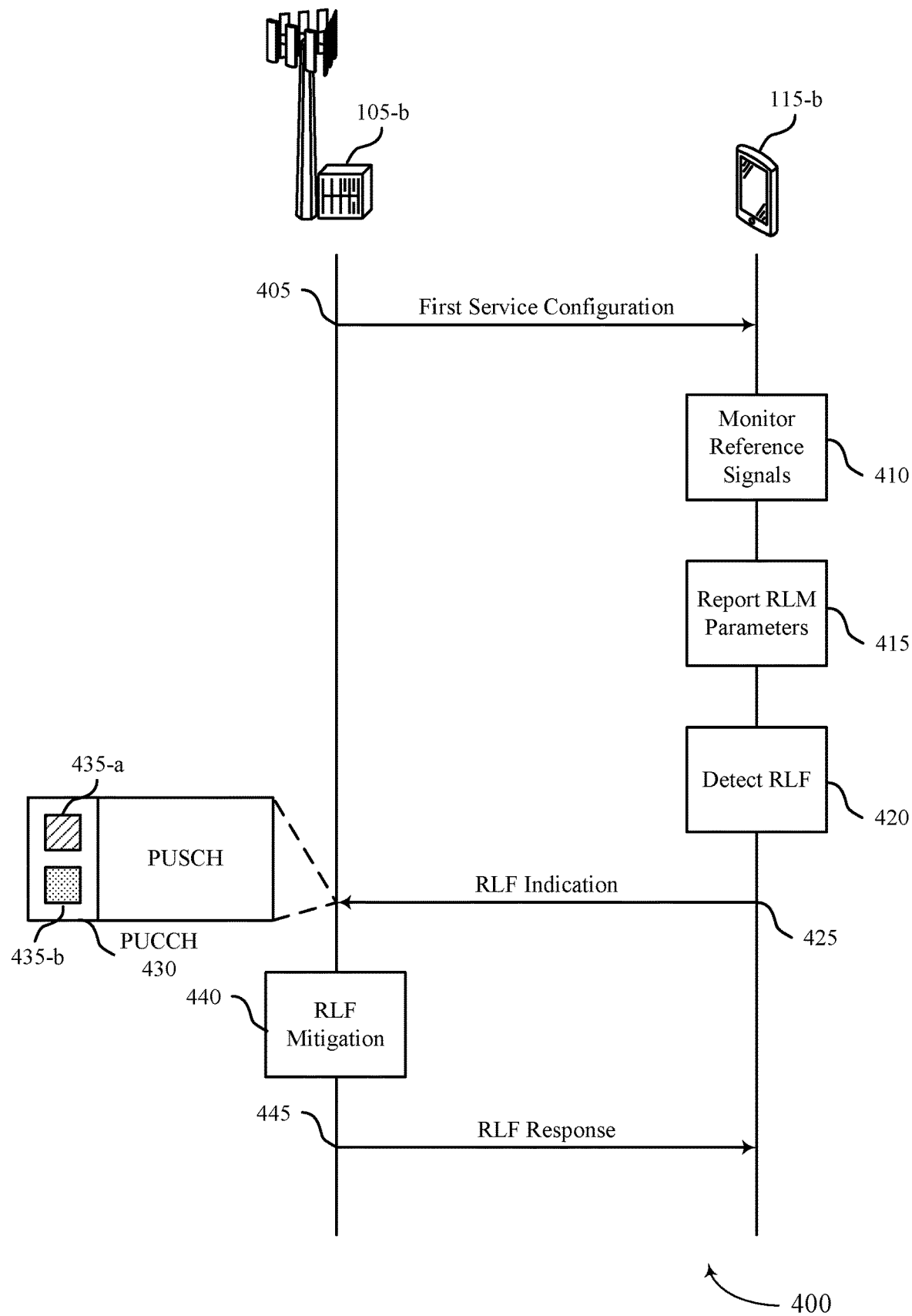
FIGS. 4 and 5 illustrate examples of process flows that support RLM and RLF recovery in accordance with aspects of the present disclosure.

FIG. 4 illustrates an example of a process flow 400 that supports RLM and RLF recovery in accordance with aspects of the present disclosure. In some examples, process flow 400 may implement aspects of wireless communications systems 100 and/or 200. Process flow 400 may include a base station 105-*b* and a UE 115-*b*, which may be example of corresponding base stations 105 and UEs 115, as described herein with reference to FIGS. 1-3.

In the following description of the process flow 400, the operations between UE 115-*b* and base station 105-*b* may be performed in different orders or at different times. Certain operations may also be left out of the process flow 400, or other operations may be added to the process flow 400. It is to be understood that while UE 115-*b* and base station 105-*b* are shown performing a number of the operations of process flow 400, any wireless device may perform the operations shown.

At 405, UE 115-*b* may receive, from base station 105-*b*, a configuration of at least one RLM resource for a radio link that transports downlink traffic for a first type of service, the first type of service having a higher reliability specification (e.g., reliability requirement) and a lower latency specification (e.g., latency requirement) than a second type of service offered by base station 105-*b*. In some cases, the first type of traffic may be for a URLLC service and the second type of traffic may be for an eMBB service. In some cases, the at least one RLM resource may be a carrier, a beam, a TRP, or a combination thereof. Additionally, UE 115-*b* may receive a configuration message indicating a failure indication resource, where the UE 115-*b* may use the indicated failure indication resource for transmitting an RLF indication. The failure indication resource may be a dedicated physical random access channel (PRACH), a scheduling request (SR) resource, a PUCCH resource, or a combination thereof (e.g., Layer 1 (L1) signaling). Additionally or alternatively, the configuration message may indicate a set of failure indication resources, and the UE 115-*b* may pick in which of the failure indication resource of the set of failure indication resources to transmit an RLF indication. In some examples, the configuration may be an RRC configuration for one or more RLM resources and may indicate, for example, one or more carriers, one or more SSBs, one or more CSI-RSs, one or more reference signals, or the like, for the one or more RLM resources.

At 410, UE 115-*b* may monitor the at least one radio resource link monitoring resource for the radio link. For example, UE 115-*b* may measure a set of one or more parameters of a reference signal communicated by base station 105-*b* via the at least one RLM resource. Accordingly, UE 115-*b* may map the set of parameters to a BLER, where the set of parameters may include at least one of a BLER parameter, a delay spread parameter, a Doppler parameter, a repetition factor parameter, an SNR parameter, a SNIR parameter, or any combination thereof.

At 415, UE 115-*b* may report measurements of the one or more parameters (e.g., out-of-synchronization/in-synchronization indication, BLER, channel parameters, etc.) to a higher layer (e.g., RRC layer).

At 420, UE 115-*b* may detect that the radio link satisfies a failure condition for the first type of service based on monitoring the at least one RLM resource. In some cases, UE 115-*b* may determine a target BLER for an out-of-synchronization indication for a control channel (e.g., PDCCH hypothetical BLER target) based on the configuration, where the radio link is detected to satisfy the failure condition for the first type of service based on the target BLER. In some examples, the UE may detect URLLC RLF. For example, UE 115-*b* may detect that the radio link satisfies the failure condition (e.g., exceeds a target BLER) for the first type of service. The UE 115-*b* may measure a set of parameters, such as a SNR, a signal to interference plus noise ratio (SINR), delay spread, Doppler, or the like, or any combination thereof, associated with one or more reference signals received via the configured RLM resources. The UE 115-*b* may map the measured set of parameters to calculate a BLER, and may compare the calculated BLER to a BLER target. The UE 115-*b* may, for example, detect that the radio link satisfies the failure condition if the calculated BLER exceeds the BLER target. The UE 115-*b* may identify an OOS indication when the calculated BLER exceeds the BLER target.

In some cases, statistical analysis may be used to determine a relationship between the set of parameters and a set of BLER values, and the UE 115-*b* may calculate BLER for the set of parameters by mapping the measured set of parameters to a particular value for a BLER. In some examples, the UE 115-*a* may store a formula or a lookup table that includes the measured set of parameters as inputs, and may apply the formula to map the measured set of parameters for calculating the BLER.

In some cases, mapping the set of parameters may include predicting a BLER for a future hypothetical control channel (e.g., PDCCH) transmission based on the set of parameters. The UE 115-b may detect that the radio link satisfies the failure condition for the first type of service based on the predicted BLER as described herein with reference to FIGS. 3A and 3B. In some cases, UE 115-b may receive traffic for the second type of service via the radio link and monitor reference signals for the second type of service. Additionally, UE 115-b may receive DCI via the at least one RLM resource. In some examples, the UE 115-b may monitor the configured reference signals of the at least one RLM sources and may report parameters (e.g., OOS indication, IS indication, BLER, channel parameters, or the like) to a higher layer.

Additionally or alternatively, UE 115-b may determine a hypothetical BLER for an autonomous downlink transmission or a semi-persistently scheduled downlink transmission via a PDSCH, identify an out-of-synchronization indication based on the BLER of a hypothetical PDSCH, and detect that the radio link satisfies the failure condition for the first type of service based on identifying the out-of-synchronization indication. In some cases, UE 115-b may detect that the radio link does not satisfy a second failure condition for the second type of service within a time period in which the radio link satisfies the failure condition for the first type of service (e.g., RLF detected for the first type of service but not for the second type of service). For example, a first type of service may have a first BLER target and a second type of service may have a second, more lenient, BLER target. In some cases, the calculated BLER may exceed the first BLER target but not the second BLER target.

At 425, UE 115-b may transmit an RLF indication for the first type of service to base station 105-b based on detecting that the radio link satisfies the failure condition for the first type of service. For example, UE 115-b may explicitly indicate the RLF for the first type of service to base station 105-b through Layer 1 (L1)1/Layer 2 (L2) signaling transmitted to the base station 105-b. In some examples, the UE 115-b may transmit the RLF indication for URLLC via a SR resource, a PRACH, a PUCCH, an uplink MAC-CE, or the like, or any combination thereof.

In some cases, UE 115-b may explicitly and/or implicitly suggest at least one new resource (e.g., carrier, beam, TRP) for the radio link for the first type of service. For example, UE 115-b may transmit a new resource indication requesting a new resource for the radio link based on detecting that the radio link satisfies the failure condition for the first type of service and based on detecting that a quality parameter of the new resource satisfies a quality parameter target. The new resource indication may indicate a carrier, a beam, a TRP, a repetition factor, a diversity order, or any combination thereof.

In an example, the first service configuration 405 may configure the UE 115-b with a set of RLF resources in which the UE 115-b may transmit the RLF indication. Each RLF resource in the set of RLF resources may correspond to a different new resource that the UE 115-b may request when RLF is detected. The UE 115-b may monitor at least one quality parameter for each of the different new resources. When an RLF is detected, the UE 115-b may select one of the different new resources having the best quality parameter (e.g., best SNR), and identify an RLF resource from the set of RLF resources that corresponds to the selected new resources. By transmitting an RLF indication in the identified RLF resource, the UE 115-b may suggest that the base station 105-b allocate the new resource to the radio link.

In an example, for a PRACH or scheduling request (SR) based approach, the UE 115-a may transmit within a particular failure indication resource 435 (e.g., a PRACH or SR resource) of PUCCH 430 corresponding to a suggested new resource. For example, UE 115-b may transmit the RLF indication via a first failure indication resource 435-a of a set of failure indication resources (e.g., 435-a, 435-b) indicated in the configuration message to request a first new resource associated with the first failure indication resource, and may transmit the RLF indication via a second failure indication resource 435-b of a set of failure indication resources (e.g., 435-a, 435-b) indicated in the configuration message to request a second new resource associated with the second failure indication resource. The UE 115-b may select between the first and second new resources, and corresponding between the first and second failure indication resource 435-a, 435-b, based on measurements of a quality parameter for the each of the first and second new resources.

In some cases, the quality parameter may be the same parameter used for evaluating whether the failure condition is satisfied (e.g., the quality parameter is a BLER), or some other metric, or may be used in combination with BLER. For example, UE 115-b may transmit a new resource indication requesting a new resource for the radio link based on detecting that the radio link satisfies the failure condition for the first type of service and based on detecting that another set of resources have a better link quality, which can meet a certain link quality target.

In some cases, UE 115-b may explicitly suggest a new resource by transmitting the RLF indication in, for example, a medium access control (MAC) control element (CE) via an uplink shared channel of the second type of service (e.g., an eMBB PUSCH) that indicates a request for a particular new resource for the radio link. For example, the second type of service may serve as a fallback connection for the first type of service, and may be used for sending control information and signaling to serving base station 105-b. Additionally or alternatively, the UE 115-b may transmit explicit signaling on a PUCCH or a medium access control (MAC) control element (CE) to indicate one or more desired new resource (s) for the radio link, to suggest a repetition factor for the downlink control channel (PDCCH), to suggest a diversity order, or the like.

In some cases, UE 115-b may transmit an indicator that indicated a failure type for the radio link from a plurality of different failure types. For example, UE 115-b may indicate whether PDCCH fails, PUCCH fails, SR fails, autonomous (e.g., grant-free) PDSCH fails, or any combination thereof.

At 440, upon reception of the RLF indication for the first type of service, base station 105-b may perform one or more mitigation procedures for the RLF. For example, base station 105-b may configure UE 115-b to switch the first type of service to a different resource with assistance from UE 115-b. In some cases, base station 105-b may move the first type of service to a different carrier, beam, or TRP for UE 115-b, and may communicate the first type of service in accordance with the move. Additionally or alternatively, base station 105-b may configure the first type of service to use multiple carriers, multiple beams, or multiple TRPs (e.g., with PDCCH/PDSCH repetition) for UE 115-b. In some examples, the base station 105-b may select one or more mitigation procedures based on the indicated failure type. For SR failure, the base station 105-b may increase a number of symbols (e.g., OFDM symbols) to permit the UE 115-b to send a longer scheduling request. For PDCCH or PUCCH failure, the base station 105-b may increase a number repetition of a PDCCH or a PUCCH transmission.

For autonomous (e.g., grant-free) PDSCH failure, the base station 105-b may allocate dedicated resources for autonomous (e.g., grant-free) PDSCH transmissions. For a downlink RLF for grant-free transmission, base station 105-b may mitigate RLF by using a larger bandwidth and/or a lower MCS for a downlink shared channel, utilizing repetition for activation/deactivation for a downlink control channel, or a combination thereof.

Additionally or alternatively, base station 105-b may deactivate the current connection for the first type of service at UE 115-b (e.g., with certain deactivation signaling such as transmitting a deactivation indicator). Base station 105-b may deactivate the connection when, for example, up to all resources for the first type of service have been determined to fail. In this case, both base station 105-b and UE 115-b may report the RLF for the first type of service to an upper layer, and UE 115-b may turn off related operations for the first type of service (e.g., to save power).

At 445, UE 115-b may receive, from base station 105-b, an RLF response based on transmitting the RLF indication. In some cases, the RLF response may indicate a change to a carrier, a beam, a TRP, or any combination thereof, for the radio link. Additionally or alternatively, the RLF response may configure or schedule UE 115-b to use multiple carriers, multiple beams, multiple TRPs, a repetition pattern, or any combination thereof, for the radio link. In some cases, the RLF response may indicate a change to a bandwidth parameter, a MCS, a repetition pattern parameter, a communication parameter, or any combination thereof, of a semi-persistently scheduled transmission associated with the first type of service. In some examples, the UE 115-b may receive the RLF response from the base station 105-b in DCI signaling or a MAC CE. In some examples, the RLF response may activate a new resource (e.g., beam, carrier, TRP, etc.) for the radio link, indicate an increase to a repetition factor to signal increased repetition of transmission via the radio link, or the like. In some examples, the base station 105-b may transmit the RLF response even when the RLF indication is transmitted by the UE 115-b for a predicted RLF, instead of or in addition to an actual RLF. The RLF response may be used to prevent the BLER target from being exceeded for the first type of service, thereby reducing errors, latency, and retransmissions for the first type of service.

In some cases, the RLF response may include an index corresponding to a table that indicated the mitigation to employ. For example, the UE 115-b and the base station 105-b may each store a table that includes a set of one or more resources, communication parameters, repetition parameters, or the like. The RLF response may include a set of bits that is used to index the table. For example, a first index may correspond to one or more of a first carrier, a first beam, and a first TRP, and a second index may correspond to multiple carriers, multiple beams, and multiple TRPs.

Based on the RLF response reconfiguring the radio link, the UE 115-b may continue to monitor the RLM resources and to calculate a BLER as described herein. At some point in time, the UE 115-b may detect an in-sync indication for the radio link based on the calculated BLER. In some examples, UE 115-b may transmit an in-synchronization indication to indicate that the radio link no longer satisfies the failure condition for the first type of service. For example, when the link quality improves, UE 115-b may transmit an in-synchronization indication (e.g., a "back-in-sync" indication) to base station 105-b giving the base station 105-b the option to reconfigure the radio link to conserve network resources. For example, the base station 105-b may reduce a number of component carriers, beams, TRPs, reduce a bandwidth, increase a coding and modulation scheme, decrease a repetition pattern factor for control channel transmissions, modify a communication parameter, or the like. The net effect of such modification may be to allocate fewer resources for the radio link to conserve resources.

Figure 5:
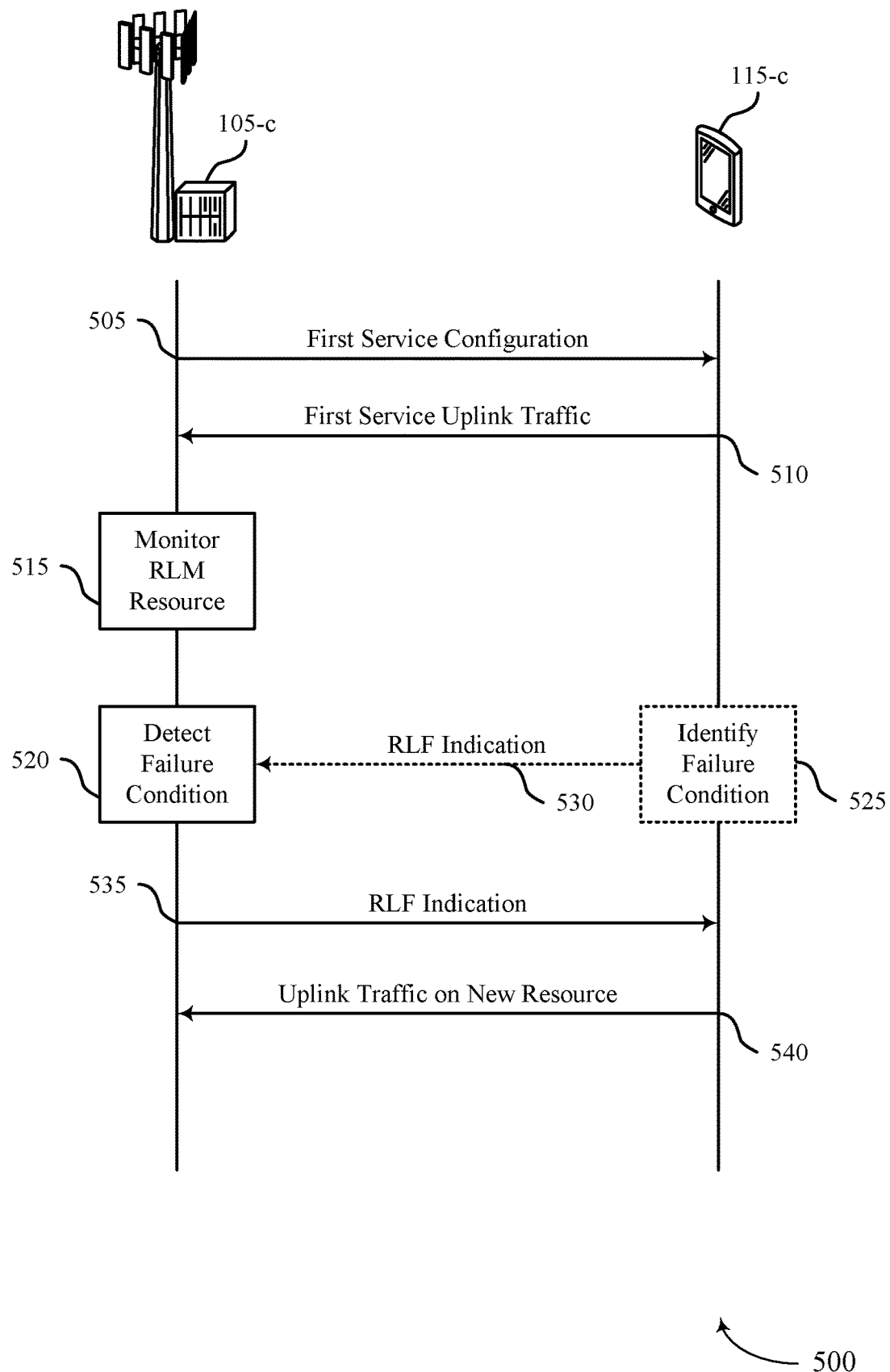

FIG. 5 illustrates an example of a process flow 500 that supports RLM and RLF recovery in accordance with aspects of the present disclosure. In some examples, process flow 500 may implement aspects of wireless communications systems 100 and/or 200. Process flow 500 may include a base station 105-c and a UE 115-c, which may be example of corresponding base stations 105 and UEs 115, as described herein with reference to FIGS. 1-4.

In the following description of the process flow 500, the operations between UE 115-c and base station 105-c may be performed in different orders or at different times. Certain operations may also be left out of the process flow 500, or other operations may be added to the process flow 500. It is to be understood that while UE 115-c and base station 105-c are shown performing a number of the operations of process flow 500, any wireless device may perform the operations shown.

At 505, UE 115-c may receive, from base station 105-c, a configuration of at least one reference signal for a radio link that transports uplink traffic for a first type of service, the first type of service having a higher reliability specification (e.g., reliability requirement) and a lower latency specification (e.g., latency requirement) than a second type of service offered by base station 105-c. In some cases, the first type of service may include URLLC, and the second type of service may include eMBB. In some examples, the configuration may be an RRC configuration for one or more reference signals and may indicate, for example, reference signals on one or more carriers or using one or more beams.

At 510, UE 115-c may transmit, to base station 105-c, uplink traffic for the first type of service via a radio uplink. In some cases, UE 115-c may transmit a reference signal (e.g., SRS) to base station 105-c.

At 515, base station 105-c may monitor the at least one reference signals for a radio link that transports uplink traffic for the first type of service from UE 115-c. The base station 105-c may monitor the at least one reference signal in a similar manner to the description provided herein and in FIG. 4. In some cases, a first monitoring periodicity of the reference signal associated with the first type of service may be shorter than a second monitoring periodicity of the second reference signal associated with the second type of service. For example, the UE 115-c may measure reference signals within a first reference signal more often for a first type of service than the UE 115-a measures reference signals within a second reference signal for a second type of service. In some cases, the first reference signal may be the same as the second reference signal, and in other the first and second reference signal may differ.

At 520, base station 105-c may detect that the radio link satisfies a failure condition for the first type of service based on monitoring the at least one reference signal transmitted from the UE. The base station 105-c may detect that the radio link satisfies the failure condition in the same or similar manner to the description provided herein and in FIG. 4. For example, base station 105-c may measure a parameter of a reference signal communicated by UE 115-c and may map the measured parameter to a BLER, where the radio link is detected to satisfy the failure condition for the first type of service based on the BLER. In some cases, the measured parameter may be an SNR or SINR. The base station 105-*c* may measure a set of one or more parameters for the reference signal to calculate BLER in a similar manner to the discussion herein and in FIG. 4. Additionally, base station 105-*b* may generate an RLF indication based on jointly encoding at least one parameter with a transmit power command. The transmit power command may be an instruction to the UE 115-*b* to use a particular transmit power for uplink transmissions.

At 525, UE 115-*c* optionally may identify that the radio uplink satisfies the failure condition for the first type of service based on determining that a defined (e.g., predefined) number of SRs have been transmitted to base station 105-*c* without receiving an uplink grant for transmitting the uplink traffic. Accordingly, at 530, UE 115-*c* may transmit, to base station 105-*c*, an RLF indication based on identifying that the radio uplink satisfies the failure condition. In some examples, at 520, the base station 105-*c* may separately confirm RLF by detecting that the radio link satisfies a failure condition for the first type of service. In some examples, at 520, the base station 105-*c* may detect that the radio link satisfies a failure condition for the first type of service based at least in part on receiving the indication from the UE 115-*c*

At 535, base station 105-*c* may transmit the RLF indication for the first type of service to UE 115-*c* based on detecting that the radio link satisfies the failure condition for the first type of service. When an uplink RLF is determined, base station 105-*c* may indicate the uplink RLF to UE 115-*c* to improve the uplink link quality. In some cases, the RLF indication may indicate at least one parameter to the UE 115-*c*. In some examples, the base station 105-*c* may transmit the RLF indication for the first type of service via DCI, a downlink MAC-CE, or the like, or any combination thereof. In some cases, the downlink of the first type of service may still work, and may be used to transmit the DCI, a downlink MAC-CE, or the like, or any combination thereof (e.g., a downlink URLLC transmission). In some cases, the base station 105-*c* may use the second type of service to transmit the DCI, a downlink MAC-CE, or the like, or any combination thereof (e.g., a downlink eMBB transmission).

In some cases, the RLF indication may indicate a change to, or a different parameter to use, such as a bandwidth parameter, a MCS, a repetition pattern parameter, a communication parameter, or any combination thereof, of a semi-persistently scheduled uplink transmission associated with the first type of service. In some examples, the base station 105-*c* may transmit an RLF response that includes the RLF indication and the at least one parameter. In some examples, the UE 115-*c* may receive the RLF indication from the base station 105-*c* in DCI signaling or a MAC CE. In some cases, the RLF indication may include an index corresponding to a table that indicated the mitigation to employ, similar to the discussion provided herein.

Additionally or alternatively, the RLF indication may indicate activation of at least one resource, where the at least one resource is an additional resource for an SR (e.g., more OFDM symbols), a change to a repetition factor for an uplink control channel (e.g., PUCCH repetition of a certain factor), a dedicated uplink resource with repetition (e.g., configure or activate a dedicated grant-free uplink resource with repetition), or any combination thereof. In some cases, these activation mechanisms associated with the at least one resource may be faster than a configuration via higher layers (e.g., RRC configuration). In some examples, the RLF indication may indicate activation of, and configure or schedule UE 115-*c* to use, multiple carriers, multiple beams, multiple TRPs, a repetition pattern, or any combination thereof, for the radio uplink.

In some examples, the UE 115-*c* may jointly decode the RLF indication to obtain the at least one parameter and the transmit power command. In some examples, base station 105-*c* may transmit the RLF indication in DCI signaling or a MAC CE, such that base station 105-*c* may activate a set of one or more resources for uplink communication through DCI or MAC CE to help the UE recover from the uplink RLF.

At 540, UE 115-*c* may transmit the uplink traffic for the first type of service via at least one new resource indicated to be activated by the RLF indication, where the at least one new resource may be an additional resource for a scheduling request, a repetition factor for an uplink control channel, a dedicated resource for uplink control channel repetition, or any combination thereof.

Beneficially, the techniques described herein may improve latency by reducing the number of cell reselection procedures performed by a UE by enabling a base station to attempt to mitigate an RLF for a service having a higher reliability specification and a low latency specification.

Figure 6:
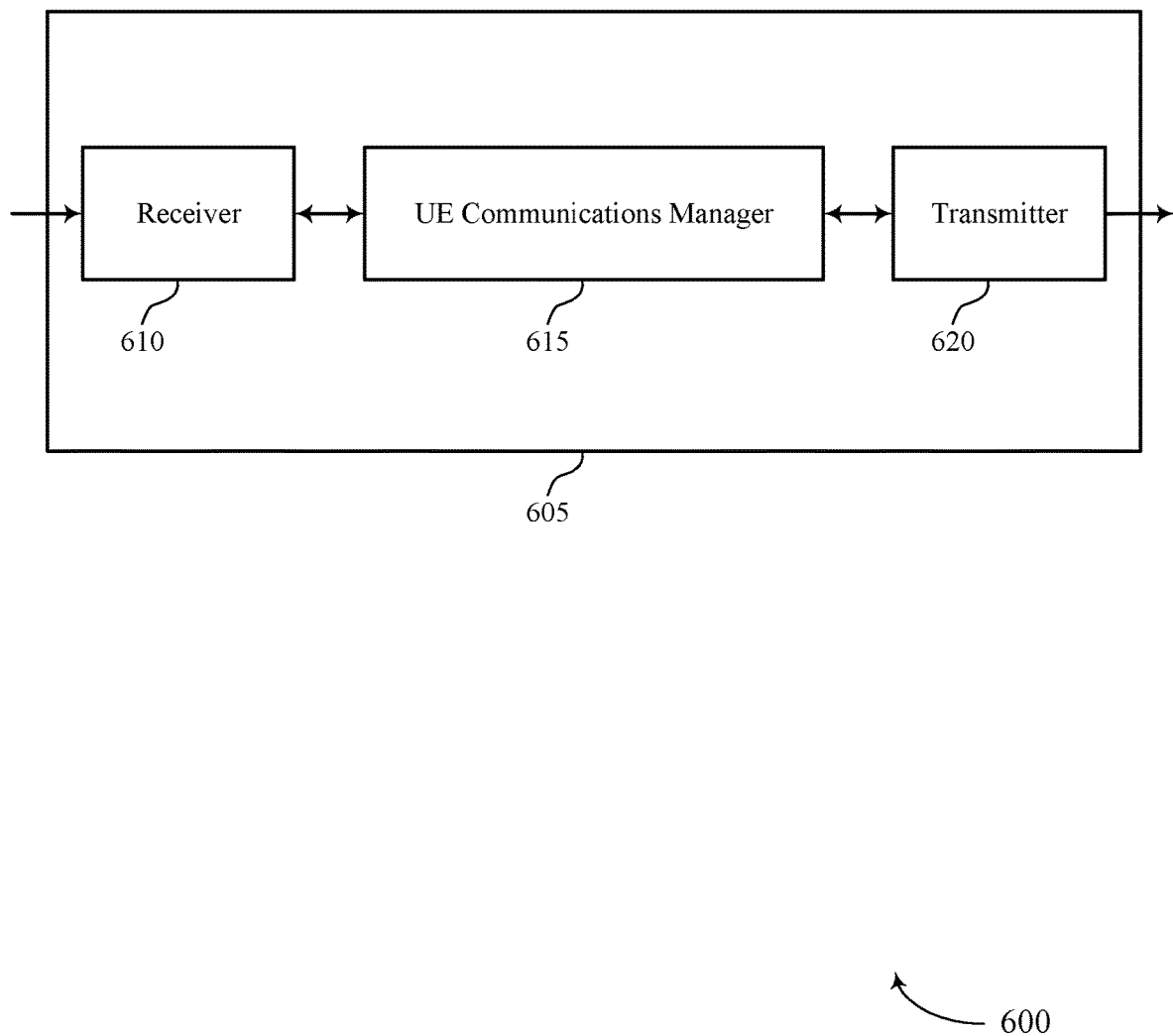
FIGS. 6 and 7 show block diagrams of devices that support RLM and RLF recovery in accordance with aspects of the present disclosure.

FIG. 6 shows a block diagram 600 of a device 605 that supports RLM and RLF recovery in accordance with aspects of the present disclosure. The device 605 may be an example of aspects of a UE 115 as described herein. The device 605 may include a receiver 610, a UE communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to RLM and RLF recovery, etc.). Information may be passed on to other components of the device 605. The receiver 610 may be an example of aspects of the transceiver 920 described with reference to FIG. 9. The receiver 610 may utilize a single antenna or a set of antennas.

The UE communications manager 615 may receive, from a base station, a configuration of at least one RLM resource for a radio link that transports downlink traffic for a first type of service, the first type of service having a higher reliability specification and a lower latency specification than a second type of service offered by the base station. In some cases, UE communications manager 615 may detect that the radio link satisfies a failure condition for the first type of service based on monitoring the at least one RLM resource. UE communications manager 615 may then transmit an RLF indication for the first type of service to the base station based on detecting that the radio link satisfies the failure condition for the first type of service.

Additionally or alternatively, the UE communications manager 615 may also transmit uplink traffic for a first type of service to a base station via a radio uplink, the first type of service having a higher reliability specification and a lower latency specification than a second type of service offered by the base station. In some cases, UE communications manager 615 may receive an RLF indication indicating that the radio uplink satisfies a failure condition for the first type of service. UE communications manager 615 may then transmit the uplink traffic for the first type of service via at least one new resource indicated to be activated by the RLF indication. The UE communications manager 615 may be an example of aspects of the UE communications manager 910 described herein. The actions performed by the UE communications manager 615 as described herein may be implemented to realize one or more potential advantages. One implementation may be that UE 115 may save power and increase battery life by avoiding having to perform lengthy cell re-selection procedures when a reference signal associated with the cell serving the UE satisfies a failure condition. In addition, the UE 115 may further reduce the extent to which it may wake up from idle periods to perform various radio link measurements. Another implementation may be that the UE 115 may have improved quality and reliability of service, as latency and the number of separate resources allocated to the UE 115 may be reduced.

The UE communications manager 615, or its sub-components, may be implemented in hardware, code (e.g., software or firmware) executed by a processor, or any combination thereof. If implemented in code executed by a processor, the functions of the UE communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The UE communications manager 615, or its sub-components, may be physically located at various positions, including being distributed such that portions of functions are implemented at different physical locations by one or more physical components. In some examples, the UE communications manager 615, or its sub-components, may be a separate and distinct component in accordance with various aspects of the present disclosure. In some examples, the UE communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
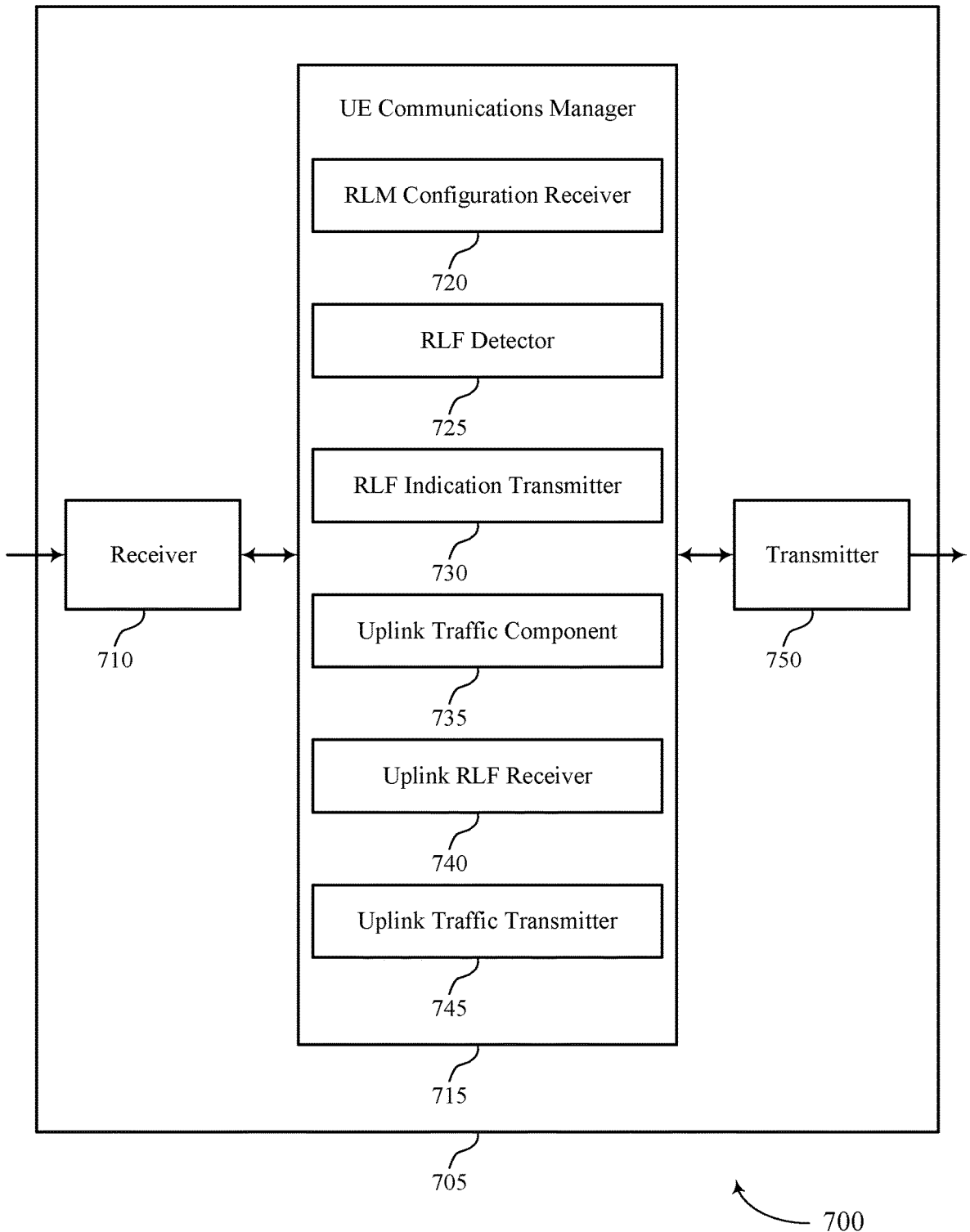

FIG. 7 shows a block diagram 700 of a device 705 that supports RLM and RLF recovery in accordance with aspects of the present disclosure. The device 705 may be an example of aspects of a device 605 or a UE 115 as described herein. The device 705 may include a receiver 710, a UE communications manager 715, and a transmitter 750. The device 705 may also include a processor. Each of these components may be in communication with one another (e.g., via one or more buses).

The receiver 710 may receive information such as packets, user data, or control information associated with various information channels (e.g., control channels, data channels, and information related to RLM and RLF recovery, etc.). Information may be passed on to other components of the device 705. The receiver 710 may be an example of aspects of the transceiver 920 described with reference to FIG. 9. The receiver 710 may utilize a single antenna or a set of antennas.

The UE communications manager 715 may be an example of aspects of the UE communications manager 615 as described herein. The UE communications manager 715 may include an RLM configuration receiver 720, an RLF detector 725, an RLF indication transmitter 730, an uplink traffic component 735, an uplink RLF receiver 740, and an uplink traffic transmitter 745. The UE communications manager 715 may be an example of aspects of the UE communications manager 910 described herein.

The RLM configuration receiver 720 may receive, from a base station, a configuration of at least one RLM resource for a radio link that transports downlink traffic for a first type of service, the first type of service having a higher reliability specification and a lower latency specification than a second type of service offered by the base station.

The RLF detector 725 may detect that the radio link satisfies a failure condition for the first type of service based on monitoring the at least one RLM resource.

The RLF indication transmitter 730 may transmit an RLF indication for the first type of service to the base station based on detecting that the radio link satisfies the failure condition for the first type of service.

The uplink traffic component 735 may transmit uplink traffic for a first type of service to a base station via a radio uplink, the first type of service having a higher reliability specification and a lower latency specification than a second type of service offered by the base station.

The uplink RLF receiver 740 may receive an RLF indication indicating that the radio uplink satisfies a failure condition for the first type of service.

The uplink traffic transmitter 745 may transmit the uplink traffic for the first type of service via at least one new resource indicated to be activated by the RLF indication.

Based on configuring at least one RLM resource for a first service that provides a lower latency than a second service, a processor of a UE 115 (e.g., controlling the receiver 710, the transmitter 740, or the transceiver 920 as described with reference to FIG. 9) may efficiently prepare to determine that the RLM resource for the first service satisfies a failure condition. Further, the processor of UE 115 may transmit an RLF indication that indicates the first service has failed (e.g., has satisfied the failure condition). The processor of the UE 115 may turn on one or more processing units for receiving the RLM resource, increase a processing clock, or a similar mechanism within the UE 115. As such, when the RLM resource is receive, the processor may be prepared to respond and reduce an impact of a quick ramp up in processing power to more efficiently use the processing capabilities of the processor within the UE 115.

The transmitter 750 may transmit signals generated by other components of the device 705. In some examples, the transmitter 750 may be collocated with a receiver 710 in a transceiver module. For example, the transmitter 750 may be an example of aspects of the transceiver 920 described with reference to FIG. 9. The transmitter 750 may utilize a single antenna or a set of antennas.

Figure 8:
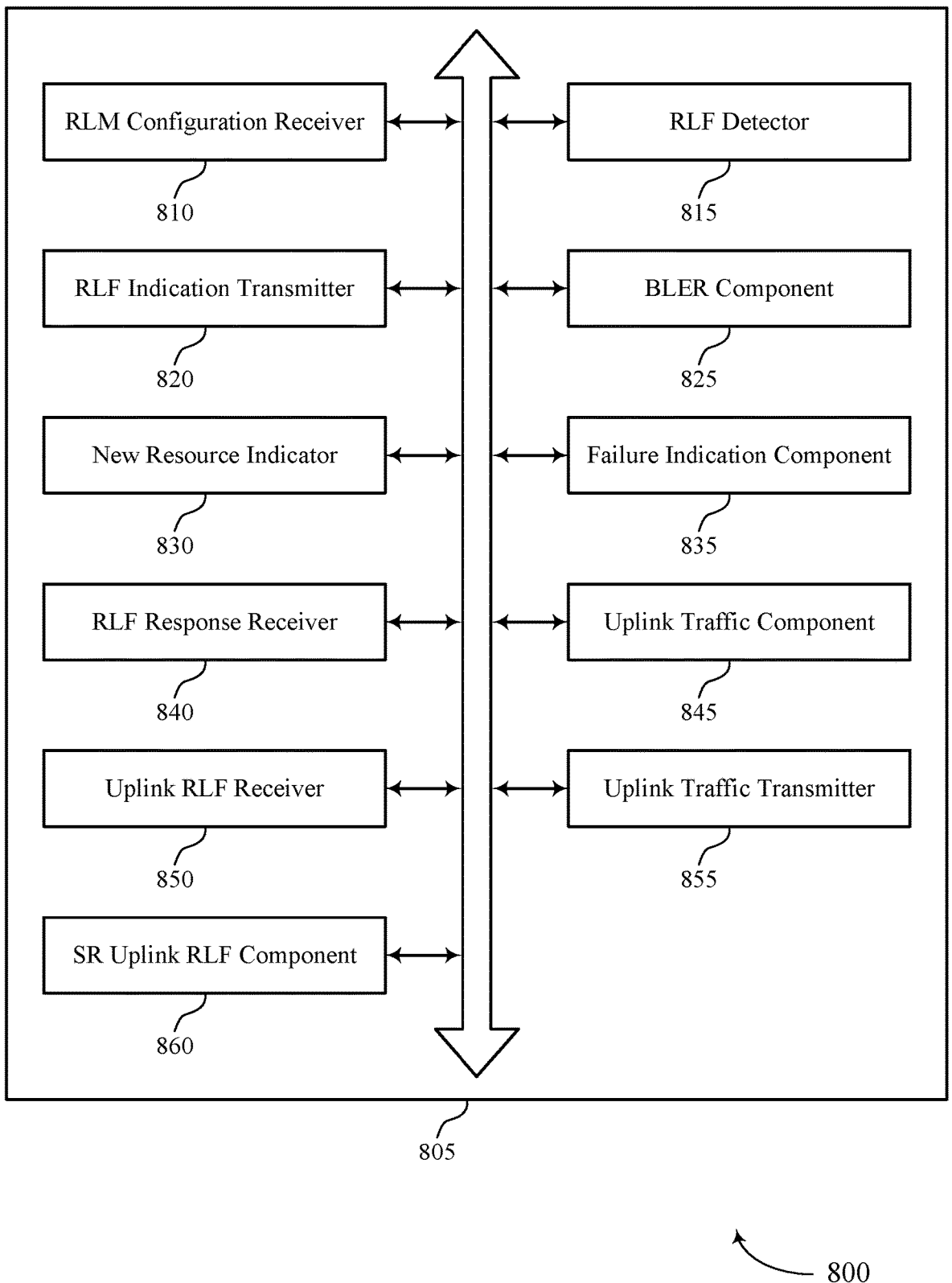
FIG. 8 shows a block diagram of a UE communications manager that supports RLM and RLF recovery in accordance with aspects of the present disclosure.

FIG. 8 shows a block diagram 800 of a UE communications manager 805 that supports RLM and RLF recovery in accordance with aspects of the present disclosure. The UE communications manager 805 may be an example of aspects of a UE communications manager 615, a UE communications manager 715, or a UE communications manager 910 described herein. The UE communications manager 805 may include an RLM configuration receiver 810, an RLF detector 815, an RLF indication transmitter 820, a BLER component 825, a new resource indicator 830, a failure indication component 835, an RLF response receiver 840, an uplink traffic component 845, an uplink RLF receiver 850, an uplink traffic transmitter 855, and a SR uplink RLF component 860. Each of these modules may communicate, directly or indirectly, with one another (e.g., via one or more buses).

The RLM configuration receiver 810 may receive, from a base station, a configuration of at least one RLM resource for a radio link that transports downlink traffic for a first type of service, the first type of service having a higher reliability specification and a lower latency specification than a second type of service offered by the base station.

In some cases, the first type of service and the second type of service are provided by the base station or configured on a same component carrier. Accordingly, the RLM configuration receiver 810 may monitor the at least one RLM resource to determine a first parameter for the radio link for the first type of service and may monitor the at least one RLM resource to determine a second parameter for the second type of service. Alternatively, the first type of service and the second type of service may be provided by different base stations or configured on a different component carriers. As such, the RLM configuration receiver 810 monitor the at least one RLM resource to determine a first set of parameters for the radio link for the first type of service and may monitor a second RLM resource to determine a second parameter for a second radio link for the second type of service.

In some examples, the RLM configuration receiver 810 may receive traffic for the second type of service via the radio link. In some examples, the RLM configuration receiver 810 may receive downlink control information via the at least one RLM resource. In some examples, the RLM configuration receiver 810 may receive, from the base station, a configuration of at least one reference signal (e.g., an RLM resource) for the radio uplink. In some examples, the RLM configuration receiver 810 may receive downlink control information via the at least one RLM resource. In some cases, the at least one RLM resource is a carrier, a beam, a transmission/reception point, or any combination thereof. In some cases, the first type of service is a ultra-reliable low latency service and the second type of service is an enhanced mobile broadband service. In some cases, a first monitoring periodicity of the at least one RLM resource associated with the first type of service is shorter than a second monitoring periodicity of an RLM resource associated with the second type of service. In some cases, the at least one RLM resource is associated with the first type of service and a second RLM resource is associated with the second type of service, and where a first monitoring periodicity of the at least one RLM resource associated with the first type of service is shorter than a second monitoring periodicity of the second RLM resource associated with the second type of service.

The RLF detector 815 may detect that the radio link satisfies a failure condition for the first type of service based on monitoring the at least one RLM resource. In some examples, the RLF detector 815 may determine a hypothetical block error rate for an autonomous downlink transmission or a semi-persistently scheduled downlink transmission via a PDSCH. In some examples, the RLF detector 815 may identify an out of synchronization indication based on the hypothetical block error rate. In some examples, the RLF detector 815 may detect that the radio link satisfies the failure condition for the first type of service based on the out of synchronization indication. In some examples, the RLF detector 815 may detect that the radio link does not satisfy a second failure condition for the second type of service within a time period in which the radio link satisfies the failure condition for the first type of service.

The RLF indication transmitter 820 may transmit an RLF indication for the first type of service to the base station based on detecting that the radio link satisfies the failure condition for the first type of service. In some examples, the RLF indication transmitter 820 may transmit an indicator that indicates a failure type for the radio link from a set of different failure types. In some examples, the RLF indication transmitter 820 may transmit an in-synchronization indication to indicate that the radio link no longer satisfies the failure condition for the first type of service.

The uplink traffic component 845 may transmit uplink traffic for a first type of service to a base station via a radio uplink, the first type of service having a higher reliability specification and a lower latency specification than a second type of service offered by the base station. In some examples, the uplink traffic component 845 may transmit a reference signal to the base station. In some cases, the first type of service is a ultra-reliable low latency service and the second type of service is an enhanced mobile broadband service.

The uplink RLF receiver 850 may receive an RLF indication indicating that the radio uplink satisfies a failure condition for the first type of service. In some examples, the uplink RLF receiver 850 may jointly decode the RLF indication to obtain at least one parameter and a transmit power command. In some cases, the RLF indication is received in downlink control information signaling via a PDCCH or a MAC CE via a PDSCH. In some cases, the RLF indication indicates at least one parameter.

The uplink traffic transmitter 855 may transmit the uplink traffic for the first type of service via at least one new resource indicated to be activated by the RLF indication. In some cases, the at least one new resource is an additional resource for a scheduling request, a repetition factor for an uplink control channel, a dedicated resource for uplink control channel repetition, or any combination thereof.

The BLER component 825 may determine a target block error rate for an out of synchronization indication for a hypothetical PDCCH based on the configuration, where the radio link is detected to satisfy the failure condition for the first type of service based on the target block error rate. In some examples, the BLER component 825 may measure a set of parameters of a reference signal communicated by the base station via the at least one RLM resource. In some examples, the BLER component 825 may map the set of parameters to a block error rate. In some examples, the BLER component 825 may detect that the radio link satisfies the failure condition for the first type of service based on the block error rate. In some examples, the BLER component 825 may predict a block error rate for a future hypothetical PDCCH transmission based on the set of parameters, where the radio link is detected to satisfy the failure condition for the first type of service based on the predicted block error rate. In some cases, the set of parameters include at least one of a block error rate parameter, a delay spread parameter, a Doppler parameter, a repetition factor parameter, a signal to noise ratio parameter, a signal to noise plus interference parameter, or any combination thereof.

The new resource indicator 830 may transmit a new resource indication requesting a new resource for the radio link based on detecting that the radio link satisfies the failure condition for the first type of service and based on detecting that a quality parameter of the new resource satisfies a quality parameter target. In some cases, the new resource indication indicates a carrier, a beam, a transmission/reception point, a repetition factor, a diversity order, or any combination thereof.

The failure indication component 835 may receive a configuration message indicating a failure indication resource, where the RLF indication is transmitted via the failure indication resource. In some examples, the failure indication component 835 may transmit, via a PUSCH of the second type of service, a MAC CE including the RLF indication. In some examples, receiving a configuration message indicating a set of failure indication resources, where transmitting the RLF indication further includes. In some cases, the failure indication resource is a dedicated physical random access channel, a scheduling request resource, a physical uplink control channel resource, or a combination thereof. In some cases, the MAC CE indicates a request for a new resource for the radio link.

The RLF response receiver 840 may receive an RLF response based on transmitting the RLF indication. In some cases, the RLF response indicates a change to a carrier, a beam, a transmission/reception point, or any combination thereof, for the radio link. In some cases, the RLF response configures or schedules the UE to use multiple carriers, multiple beams, multiple transmission/reception points, a repetition pattern, or any combination thereof. In some cases, the RLF response indicates a change to a bandwidth parameter, a modulation and coding scheme, a repetition pattern parameter, a communication parameter, or any combination thereof, of a semi-persistently scheduled transmission associated with the first type of service. In some cases, the RLF response is received in downlink control information signaling via a PDCCH associated with the second type of service or a MAC CE via a PDSCH associated with the second type of service. In some cases, the RLF response includes a deactivation indicator indicating that the first type of service is deactivated.

The SR uplink RLF component 860 may identify that the radio uplink satisfies the failure condition for the first type of service based on determining that a defined number of scheduling requests have been transmitted to the base station without receiving an uplink grant for transmitting the uplink traffic. In some examples, the SR uplink RLF component 860 may transmit, to the base station, a second RLF indication based on identifying that the radio uplink satisfies the failure condition.

Figure 9:
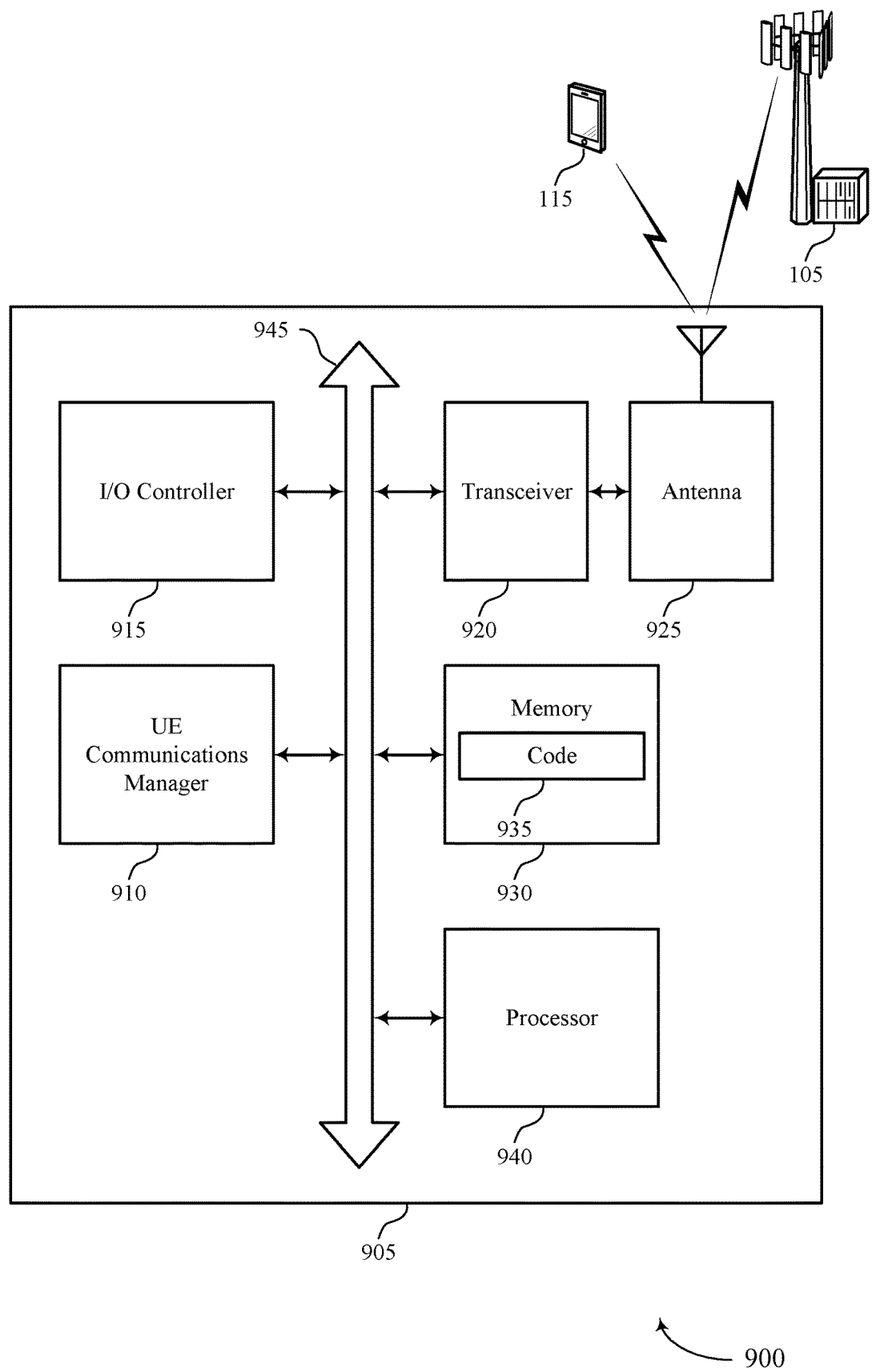
FIG. 9 shows a diagram of a system including a device that supports RLM and RLF recovery in accordance with aspects of the present disclosure.

FIG. 9 shows a diagram of a system 900 including a device 905 that supports RLM and RLF recovery in accordance with aspects of the present disclosure. The device 905 may be an example of or include the components of device 605, device 705, or a UE 115 as described herein. The device 905 may include components for bi-directional voice and data communications including components for transmitting and receiving communications, including a UE communications manager 910, an I/O controller 915, a transceiver 920, an antenna 925, memory 930, and a processor 940. These components may be in electronic communication via one or more buses (e.g., bus 945).

The UE communications manager 910 may receive, from a base station, a configuration of at least one RLM resource for a radio link that transports downlink traffic for a first type of service, the first type of service having a higher reliability specification and a lower latency specification than a second type of service offered by the base station. In some cases, UE communications manager 910 may detect that the radio link satisfies a failure condition for the first type of service based on monitoring the at least one RLM resource. UE communications manager 910 may then transmit an RLF indication for the first type of service to the base station based on detecting that the radio link satisfies the failure condition for the first type of service.

Additionally or alternatively, the UE communications manager 910 may also transmit uplink traffic for a first type of service to a base station via a radio uplink, the first type of service having a higher reliability specification and a lower latency specification than a second type of service offered by the base station. In some cases, UE communications manager 910 may receive an RLF indication indicating that the radio uplink satisfies a failure condition for the first type of service. UE communications manager 910 may then transmit the uplink traffic for the first type of service via at least one new resource indicated to be activated by the RLF indication.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting RLM and RLF recovery).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
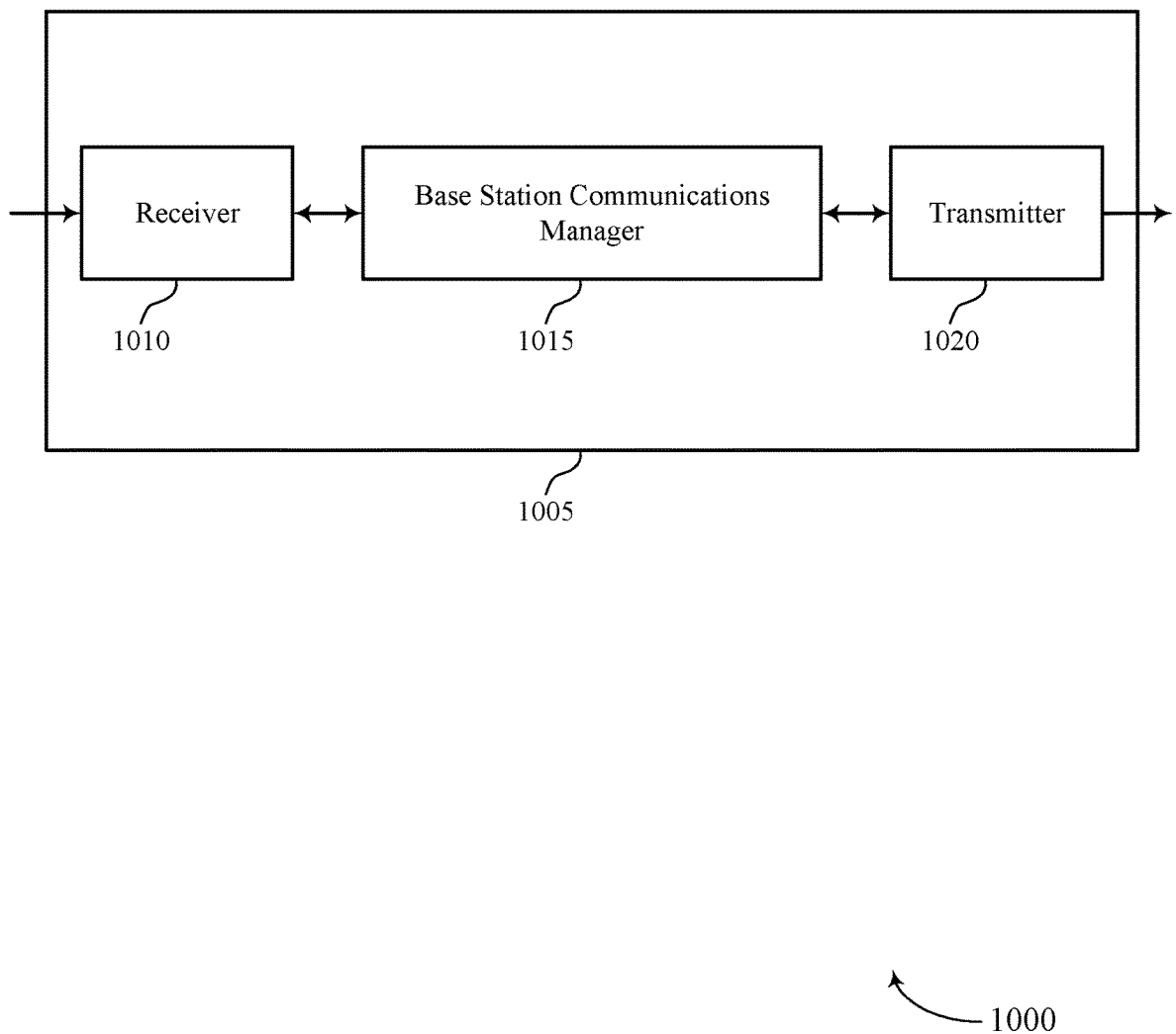
FIGS. 10 and 11 show block diagrams of devices that support RLM and RLF recovery in accordance with aspects of the present disclosure.

FIG. 10 shows a block diagram 1000 of a device 1005 that supports RLM and RLF recovery in accordance with aspects of the present disclosure. The device 1005 may be an example of aspects of a base station 105 as described herein. The device 1005 may include a receiver 1010, a base station communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to RLM and RLF recovery, etc.). Information may be passed on to other components of the device 1005. The receiver 1010 may be an example of aspects of the transceiver 1320 described with reference to FIG. 13. The receiver 1010 may utilize a single antenna or a set of antennas.

The base station communications manager 1015 may transmit, to a UE, a configuration of at least one RLM resource for a radio link that transports downlink traffic for a first type of service, the first type of service having a higher reliability specification and a lower latency specification than a second type of service offered by the base station. In some cases, base station communications manager 1015 may receive an RLF indication from the UE indicating that the radio link satisfies a failure condition for the first type of service. Base station communications manager 1015 may then transmit an RLF response to the UE based on the RLF indication.

Additionally or alternatively, the base station communications manager 1015 may also monitor at least one reference signal for a radio link that transports uplink traffic for a first type of service from a UE, the first type of service having a higher reliability specification and a lower latency specification than a second type of service offered by the base station. In some cases, base station communications manager 1015 may detect that the radio link satisfies a failure condition for the first type of service based on monitoring the at least one reference signal. Base station communications manager 1015 may then transmit an RLF indication for the first type of service to the UE based on detecting that the radio link satisfies the failure condition for the first type of service. The base station communications manager 1015 may be an example of aspects of the base station communications manager 1310 described herein.

The base station communications manager 1015, or its sub-components, may be implemented in hardware, code (e.g., software or firmware) executed by a processor, or any combination thereof. If implemented in code executed by a processor, the functions of the base station communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The base station communications manager 1015, or its sub-components, may be physically located at various positions, including being distributed such that portions of functions are implemented at different physical locations by one or more physical components. In some examples, the base station communications manager 1015, or its sub-components, may be a separate and distinct component in accordance with various aspects of the present disclosure. In some examples, the base station communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
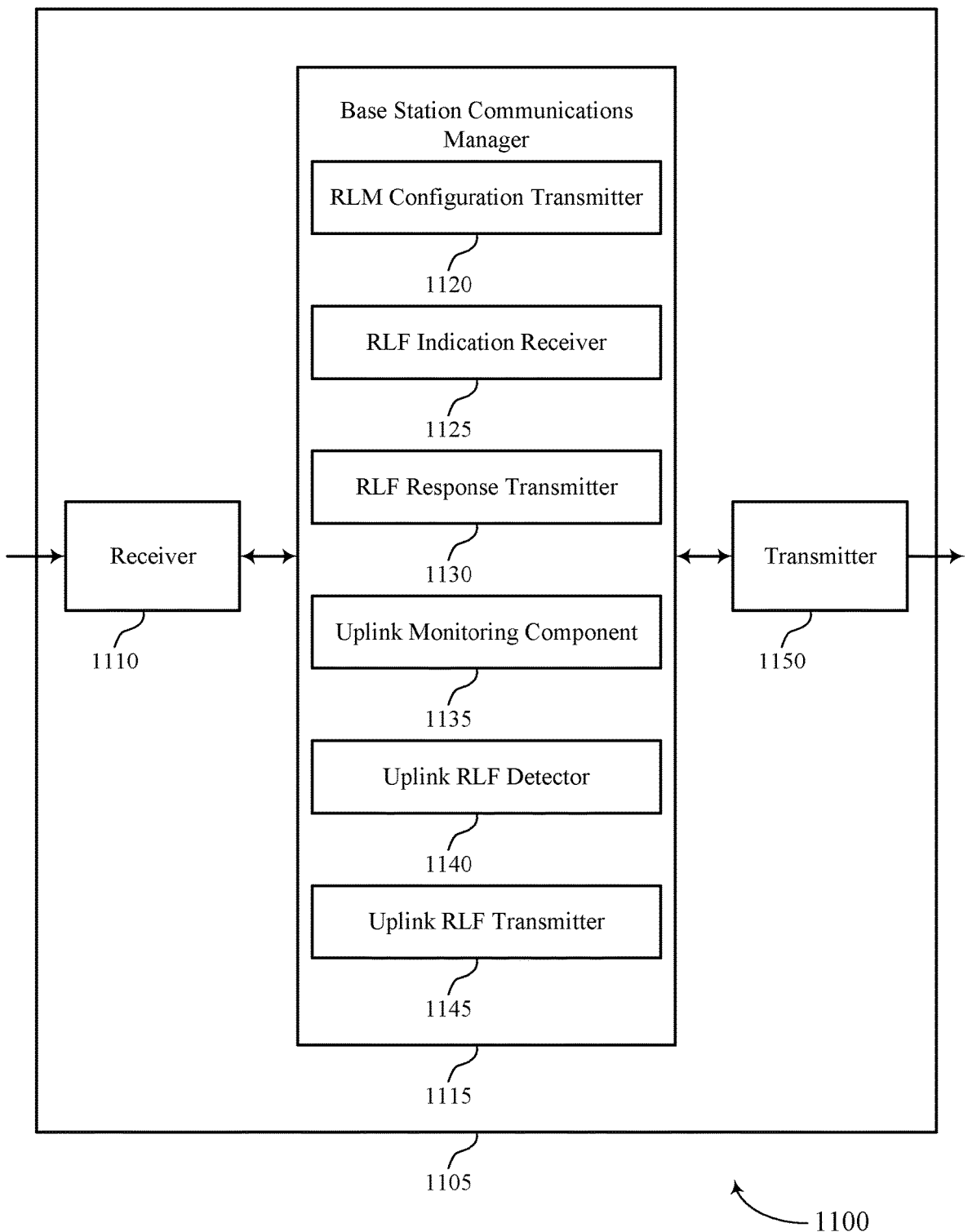

FIG. 11 shows a block diagram 1100 of a device 1105 that supports RLM and RLF recovery in accordance with aspects of the present disclosure. The device 1105 may be an example of aspects of a device 1005 or a base station 105 as described herein. The device 1105 may include a receiver 1110, a base station communications manager 1115, and a transmitter 1150. The device 1105 may also include a processor. Each of these components may be in communication with one another (e.g., via one or more buses).

The receiver 1110 may receive information such as packets, user data, or control information associated with various information channels (e.g., control channels, data channels, and information related to RLM and RLF recovery, etc.). Information may be passed on to other components of the device 1105. The receiver 1110 may be an example of aspects of the transceiver 1320 described with reference to FIG. 13. The receiver 1110 may utilize a single antenna or a set of antennas.

The base station communications manager 1115 may be an example of aspects of the base station communications manager 1015 as described herein. The base station communications manager 1115 may include an RLM configuration transmitter 1120, an RLF indication receiver 1125, an RLF response transmitter 1130, an uplink monitoring component 1135, an uplink RLF detector 1140, and an uplink RLF transmitter 1145. The base station communications manager 1115 may be an example of aspects of the base station communications manager 1310 described herein.

The RLM configuration transmitter 1120 may transmit, to a UE, a configuration of at least one RLM resource for a radio link that transports downlink traffic for a first type of service, the first type of service having a higher reliability specification and a lower latency specification than a second type of service offered by the base station.

The RLF indication receiver 1125 may receive an RLF indication from the UE indicating that the radio link satisfies a failure condition for the first type of service.

The RLF response transmitter 1130 may transmit an RLF response to the UE based on the RLF indication.

The uplink monitoring component 1135 may monitor at least one reference signal (e.g., an RLM resource) for a radio link that transports uplink traffic for a first type of service from a UE, the first type of service having a higher reliability specification and a lower latency specification than a second type of service offered by the base station.

The uplink RLF detector 1140 may detect that the radio uplink satisfies a failure condition for the first type of service based on monitoring the at least one reference signal.

The uplink RLF transmitter 1145 may transmit an RLF indication for the first type of service to the UE based on detecting that the radio link satisfies the failure condition for the first type of service.

The transmitter 1150 may transmit signals generated by other components of the device 1105. In some examples, the transmitter 1150 may be collocated with a receiver 1110 in a transceiver module. For example, the transmitter 1150 may be an example of aspects of the transceiver 1320 described with reference to FIG. 13. The transmitter 1150 may utilize a single antenna or a set of antennas.

Figure 12:
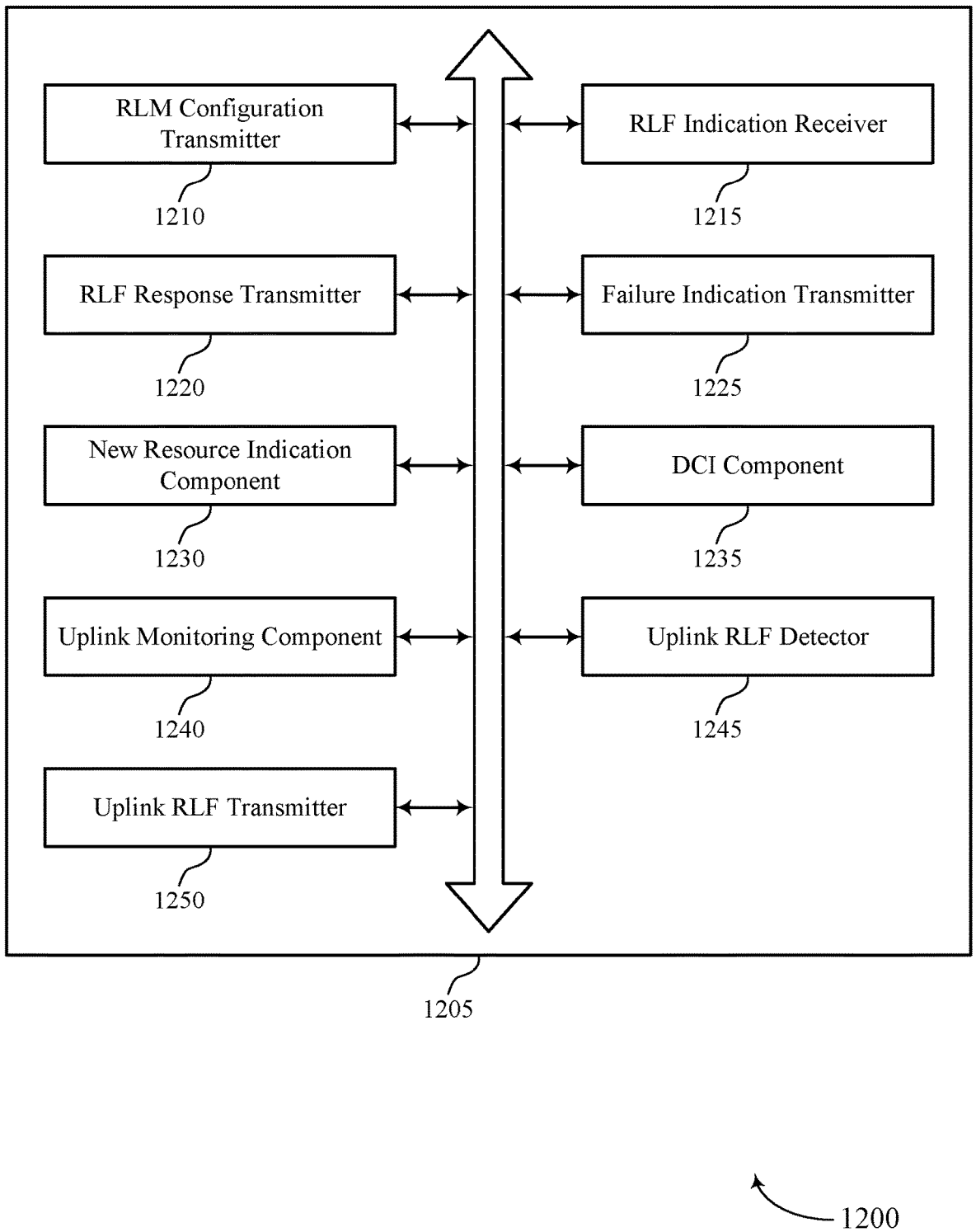
FIG. 12 shows a block diagram of a base station communications manager that supports RLM and RLF recovery in accordance with aspects of the present disclosure.

FIG. 12 shows a block diagram 1200 of a base station communications manager 1205 that supports RLM and RLF recovery in accordance with aspects of the present disclosure. The base station communications manager 1205 may be an example of aspects of a base station communications manager 1015, a base station communications manager 1115, or a base station communications manager 1310 described herein. The base station communications manager 1205 may include an RLM configuration transmitter 1210, an RLF indication receiver 1215, an RLF response transmitter 1220, a failure indication transmitter 1225, a new resource indication component 1230, a DCI component 1235, an uplink monitoring component 1240, an uplink RLF detector 1245, and an uplink RLF transmitter 1250. Each of these modules may communicate, directly or indirectly, with one another (e.g., via one or more buses).

The RLM configuration transmitter 1210 may transmit, to a UE, a configuration of at least one RLM resource for a radio link that transports downlink traffic for a first type of service, the first type of service having a higher reliability specification and a lower latency specification than a second type of service offered by the base station. In some cases, the first type of service is a URLLC service and the second type of service is an eMBB service. In some cases, a first monitoring periodicity of the at least one RLM resource associated with the first type of service is shorter than a second monitoring periodicity of an RLM resource associated with the second type of service.

The RLF indication receiver 1215 may receive an RLF indication from the UE indicating that the radio link satisfies a failure condition for the first type of service. In some examples, the RLF indication receiver 1215 may receive, via a PDSCH of the second type of service, a MAC CE including the RLF indication. In some examples, the RLF indication receiver 1215 may receive an indicator that indicates a failure type for the radio link from a set of different failure types. In some examples, the RLF indication receiver 1215 may receive an in-synchronization indication to indicate that the radio link no longer satisfies the failure condition for the first type of service. In some cases, the MAC CE indicates a request for a new resource for the radio link.

The RLF response transmitter 1220 may transmit an RLF response to the UE based on the RLF indication. In some cases, the RLF response indicates a change to a carrier, a beam, a transmission/reception point, or any combination thereof, for the radio link. In some cases, the RLF response indicates a change to a bandwidth parameter, a modulation and coding scheme, a repetition pattern parameter, a communication parameter, or any combination thereof, of a semi-persistently scheduled transmission associated with the first type of service. In some cases, the RLF response configures or schedules the UE to use multiple carriers, multiple beams, multiple transmission/reception points, a repetition pattern, or any combination thereof. In some cases, the RLF response is transmitted in downlink control information signaling or a MAC CE. In some cases, the RLF response includes a deactivation indicator indicating that the first type of service is deactivated.

The uplink monitoring component 1240 may monitor at least one reference signal (e.g., an RLM resource) for a radio link that transports uplink traffic for a first type of service from a UE, the first type of service having a higher reliability specification and a lower latency specification than a second type of service offered by the base station. In some examples, the uplink monitoring component 1240 may transmit downlink control information associated with the first type of service via the at least one RLM resource. In some cases, the first type of service is a ultra-reliable low latency service and the second type of service is an enhanced mobile broadband service. In some cases, a first monitoring periodicity of the at least one RLM resource associated with the first type of service is shorter than a second monitoring periodicity of an RLM resource associated with the second type of service.

The uplink RLF detector 1245 may detect that the radio link satisfies a failure condition for the first type of service based on monitoring the at least one reference signal. In some examples, the uplink RLF detector 1245 may measure a parameter of a reference signal communicated by the UE. In some examples, the uplink RLF detector 1245 may map the measured parameter to a block error rate, where the radio link is detected to satisfy the failure condition for the first type of service based on the block error rate. In some cases, the measured parameter is a signal to noise ratio or a signal to interference plus noise ratio.

The uplink RLF transmitter 1250 may transmit an RLF indication for the first type of service to the UE based on detecting that the radio link satisfies the failure condition for the first type of service. In some examples, the uplink RLF transmitter 1250 may generate the RLF indication based on jointly encoding at least one parameter with a transmit power command. In some cases, the RLF indication is transmitted in downlink control information signaling via a PDCCH or a MAC CE via a PDSCH. In some cases, the RLF indication indicates at least one parameter. In some cases, the RLF indication indicates activation of at least one resource. In some cases, the at least one resource is an additional resource for a scheduling request, a change to a repetition factor for an uplink control channel, a dedicated uplink resource with repetition, or any combination thereof.

The failure indication transmitter 1225 may transmit a configuration message indicating a failure indication resource, where the RLF indication is received via the failure indication resource. In some examples, transmitting a configuration message indicating a set of failure indication resources, where receiving the RLF indication further includes. In some cases, the failure indication resource is a dedicated physical random access channel, a scheduling request resource, a physical uplink control channel resource, or a combination thereof.

The new resource indication component 1230 may receive a new resource indication requesting a new resource for the radio link. Additionally, the new resource indication component 1230 may then determine the new resource indicated in the new resource indication. In some cases, the new resource indication indicates a carrier, or a beam, a transmission/reception point, or any combination thereof.

The DCI component 1235 may transmit downlink control information associated with the first type of service via the at least one RLM resource.

Figure 13:
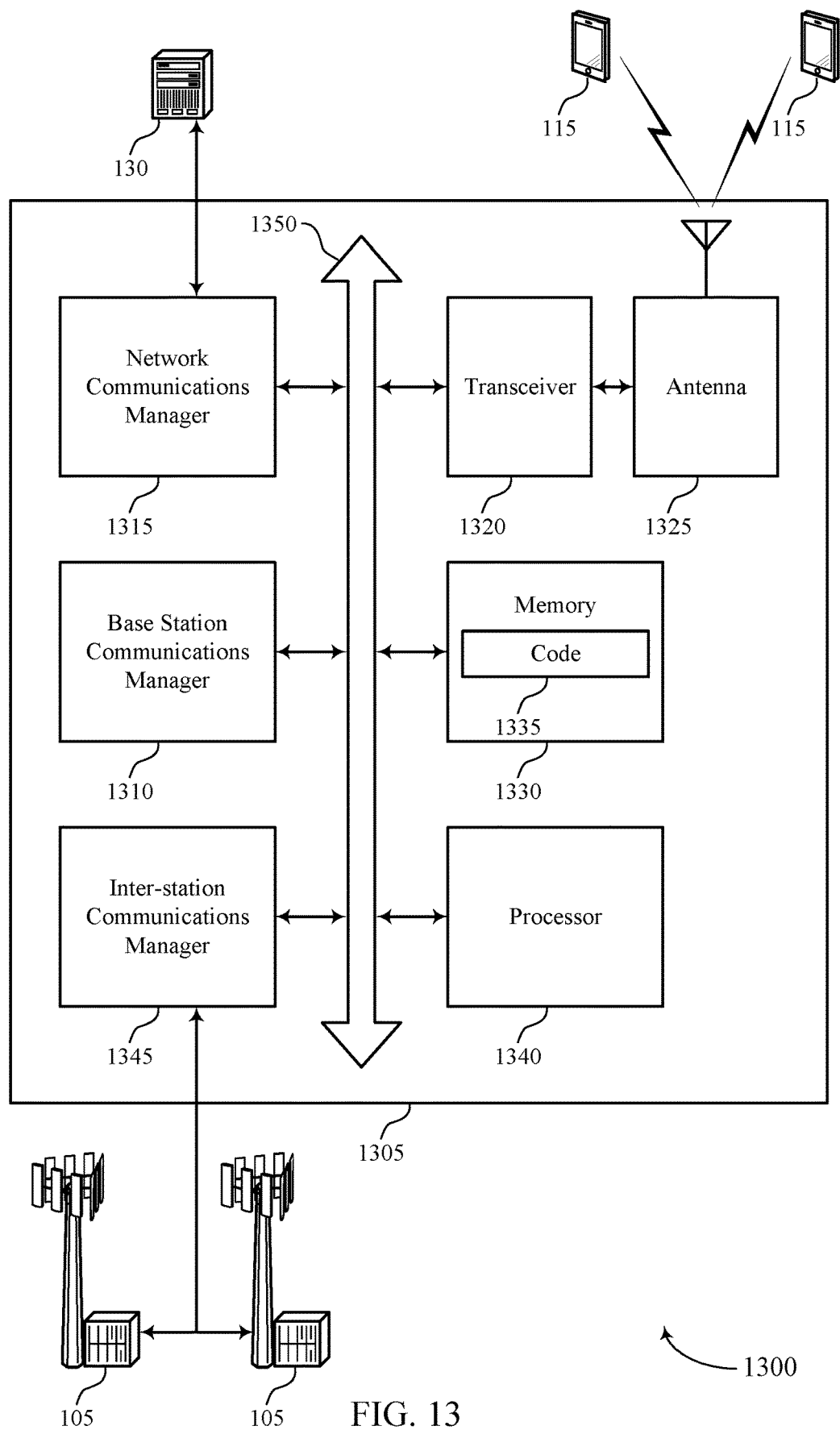
FIG. 13 shows a diagram of a system including a device that supports RLM and RLF recovery in accordance with aspects of the present disclosure.

FIG. 13 shows a diagram of a system 1300 including a device 1305 that supports RLM and RLF recovery in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a base station communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The base station communications manager 1310 may transmit, to a UE, a configuration of at least one RLM resource for a radio link that transports downlink traffic for a first type of service, the first type of service having a higher reliability specification and a lower latency specification than a second type of service offered by the base station. In some cases, base station communications manager 1310 may receive an RLF indication from the UE indicating that the radio link satisfies a failure condition for the first type of service. Base station communications manager 1310 may then transmit an RLF response to the UE based on the RLF indication.

Additionally or alternatively, the base station communications manager 1310 may also monitor at least one reference signal for a radio link that transports uplink traffic for a first type of service from a UE, the first type of service having a higher reliability specification and a lower latency specification than a second type of service offered by the base station. In some cases, base station communications manager 1310 may detect that the radio link satisfies a failure condition for the first type of service based on monitoring the at least one reference signal. Base station communications manager 1310 may then transmit an RLF indication for the first type of service to the UE based on detecting that the radio link satisfies the failure condition for the first type of service.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device to perform various functions (e.g., functions or tasks supporting RLM and RLF recovery).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
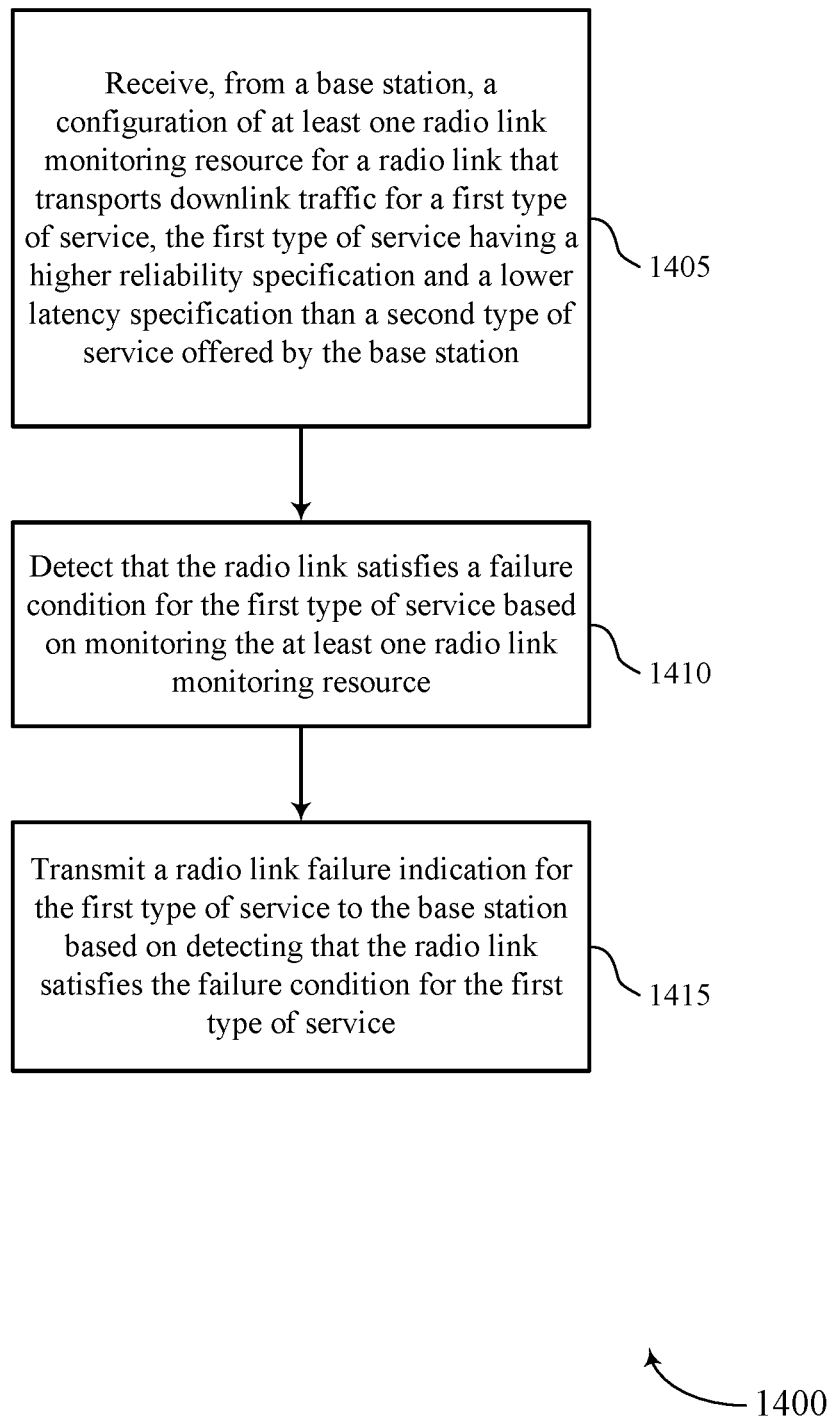
FIGS. 14 through 20 show flowcharts illustrating methods that support RLM and RLF recovery in accordance with aspects of the present disclosure.

FIG. 14 shows a flowchart illustrating a method 1400 that supports RLM and RLF recovery in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1405, the UE may receive, from a base station, a configuration of at least one RLM resource for a radio link that transports downlink traffic for a first type of service, the first type of service having a higher reliability specification and a lower latency specification than a second type of service offered by the base station. The operations of 1405 may be performed according to the methods described herein. In some examples, aspects of the operations of 1405 may be performed by an RLM configuration receiver as described with reference to FIGS. 6 through 9.

At 1410, the UE may detect that the radio link satisfies a failure condition for the first type of service based on monitoring the at least one RLM resource. The operations of 1410 may be performed according to the methods described herein. In some examples, aspects of the operations of 1410 may be performed by an RLF detector as described with reference to FIGS. 6 through 9.

At 1415, the UE may transmit an RLF indication for the first type of service to the base station based on detecting that the radio link satisfies the failure condition for the first type of service. The operations of 1415 may be performed according to the methods described herein. In some examples, aspects of the operations of 1415 may be performed by an RLF indication transmitter as described with reference to FIGS. 6 through 9.

Figure 15:
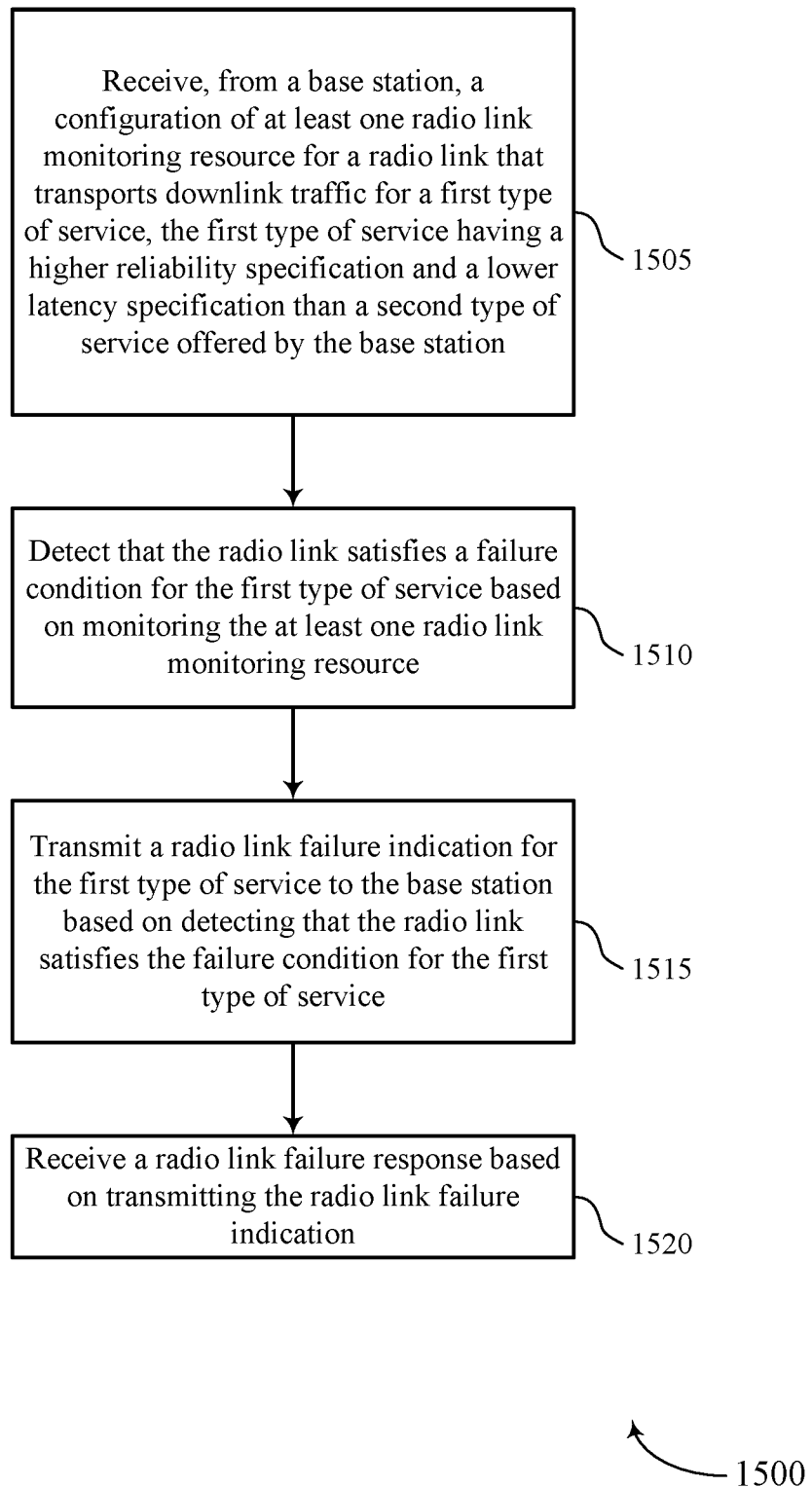

FIG. 15 shows a flowchart illustrating a method 1500 that supports RLM and RLF recovery in accordance with aspects of the present disclosure. The operations of method 1500 may be implemented by a UE 115 or its components as described herein. For example, the operations of method 1500 may be performed by a UE communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1505, the UE may receive, from a base station, a configuration of at least one RLM resource for a radio link that transports downlink traffic for a first type of service, the first type of service having a higher reliability specification and a lower latency specification than a second type of service offered by the base station. The operations of 1505 may be performed according to the methods described herein. In some examples, aspects of the operations of 1505 may be performed by an RLM configuration receiver as described with reference to FIGS. 6 through 9.

At 1510, the UE may detect that the radio link satisfies a failure condition for the first type of service based on monitoring the at least one RLM resource. The operations of 1510 may be performed according to the methods described herein. In some examples, aspects of the operations of 1510 may be performed by an RLF detector as described with reference to FIGS. 6 through 9.

At 1515, the UE may transmit an RLF indication for the first type of service to the base station based on detecting that the radio link satisfies the failure condition for the first type of service. The operations of 1515 may be performed according to the methods described herein. In some examples, aspects of the operations of 1515 may be performed by an RLF indication transmitter as described with reference to FIGS. 6 through 9.

At 1520, the UE may receive an RLF response based on transmitting the RLF indication. The operations of 1520 may be performed according to the methods described herein. In some examples, aspects of the operations of 1520 may be performed by an RLF response receiver as described with reference to FIGS. 6 through 9.

Figure 16:
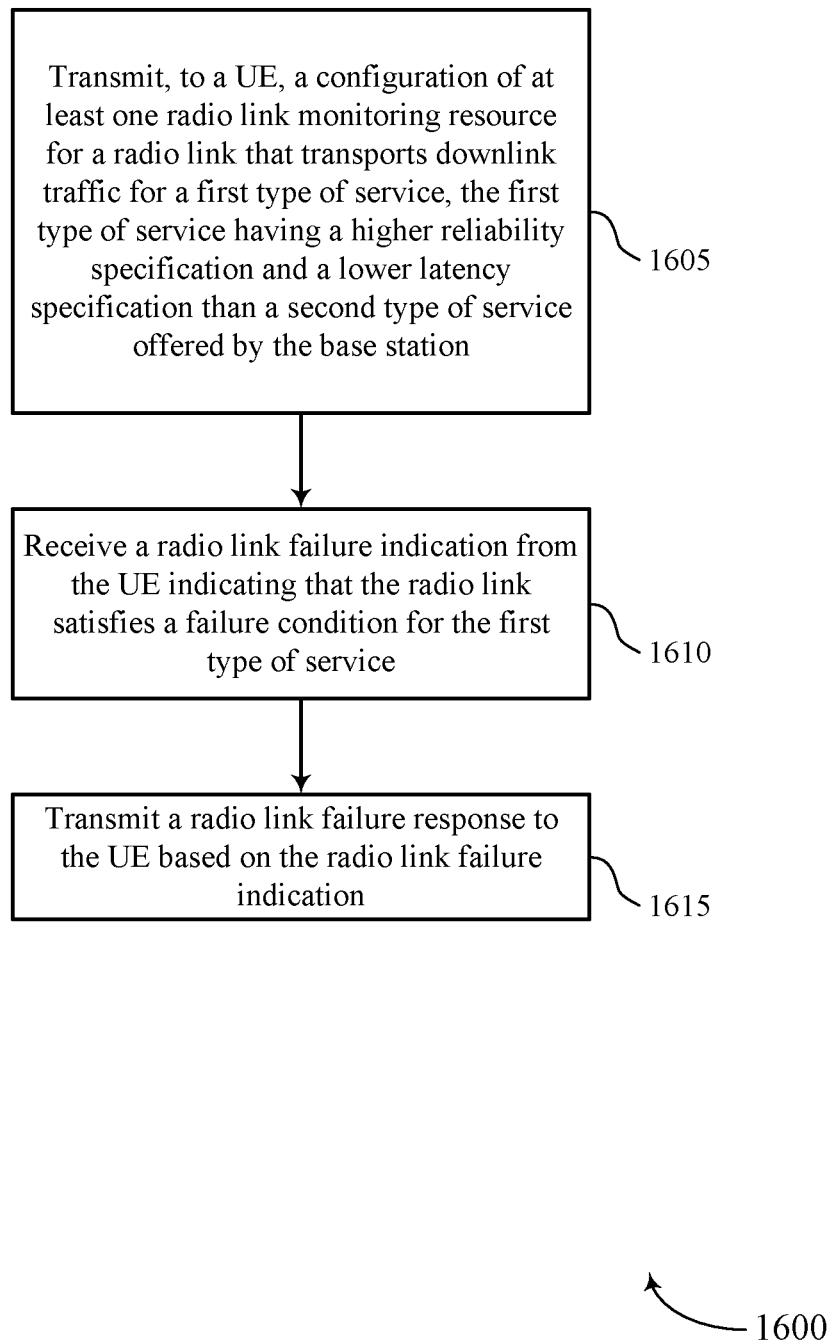

FIG. 16 shows a flowchart illustrating a method 1600 that supports RLM and RLF recovery in accordance with aspects of the present disclosure. The operations of method 1600 may be implemented by a base station 105 or its components as described herein. For example, the operations of method 1600 may be performed by a base station communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1605, the base station may transmit, to a UE, a configuration of at least one RLM resource for a radio link that transports downlink traffic for a first type of service, the first type of service having a higher reliability specification and a lower latency specification than a second type of service offered by the base station. The operations of 1605 may be performed according to the methods described herein. In some examples, aspects of the operations of 1605 may be performed by an RLM configuration transmitter as described with reference to FIGS. 10 through 13.

At 1610, the base station may receive an RLF indication from the UE indicating that the radio link satisfies a failure condition for the first type of service. The operations of 1610 may be performed according to the methods described herein. In some examples, aspects of the operations of 1610 may be performed by an RLF indication receiver as described with reference to FIGS. 10 through 13.

At 1615, the base station may transmit an RLF response to the UE based on the RLF indication. The operations of 1615 may be performed according to the methods described herein. In some examples, aspects of the operations of 1615 may be performed by an RLF response transmitter as described with reference to FIGS. 10 through 13.

Figure 17:
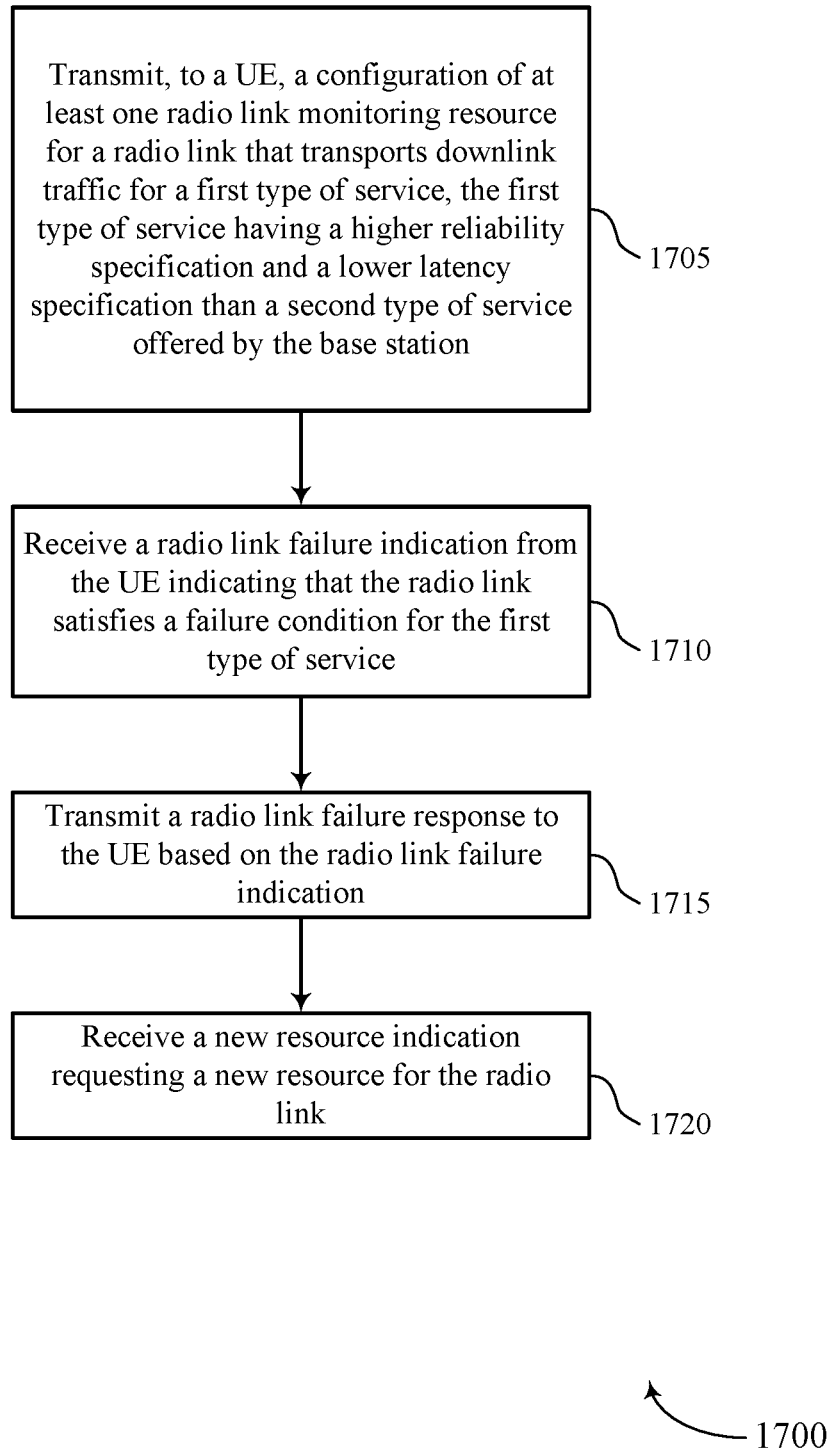

FIG. 17 shows a flowchart illustrating a method 1700 that supports RLM and RLF recovery in accordance with aspects of the present disclosure. The operations of method 1700 may be implemented by a base station 105 or its components as described herein. For example, the operations of method 1700 may be performed by a base station communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 1705, the base station may transmit, to a UE, a configuration of at least one RLM resource for a radio link that transports downlink traffic for a first type of service, the first type of service having a higher reliability specification and a lower latency specification than a second type of service offered by the base station. The operations of 1705 may be performed according to the methods described herein. In some examples, aspects of the operations of 1705 may be performed by an RLM configuration transmitter as described with reference to FIGS. 10 through 13.

At 1710, the base station may receive an RLF indication from the UE indicating that the radio link satisfies a failure condition for the first type of service. The operations of 1710 may be performed according to the methods described herein. In some examples, aspects of the operations of 1710 may be performed by an RLF indication receiver as described with reference to FIGS. 10 through 13.

At 1715, the base station may transmit an RLF response to the UE based on the RLF indication. The operations of 1715 may be performed according to the methods described herein. In some examples, aspects of the operations of 1715 may be performed by an RLF response transmitter as described with reference to FIGS. 10 through 13.

At 1720, the base station may receive a new resource indication requesting a new resource for the radio link and determine the new resource indicated in the new resource indication. The operations of 1720 may be performed according to the methods described herein. In some examples, aspects of the operations of 1720 may be performed by a new resource indication component as described with reference to FIGS. 10 through 13.

Figure 18:
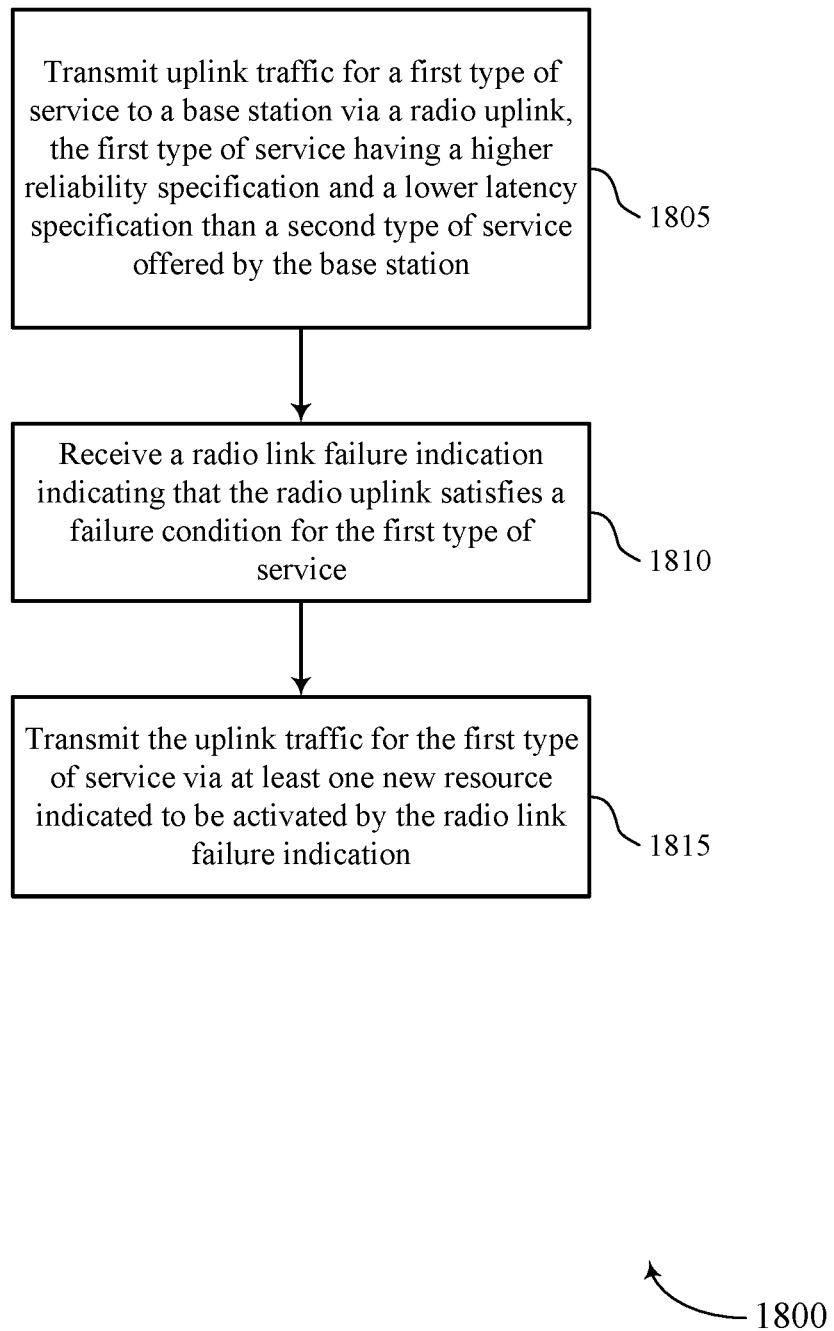

FIG. 18 shows a flowchart illustrating a method 1800 that supports RLM and RLF recovery in accordance with aspects of the present disclosure. The operations of method 1800 may be implemented by a UE 115 or its components as described herein. For example, the operations of method 1800 may be performed by a UE communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1805, the UE may transmit uplink traffic for a first type of service to a base station via a radio uplink, the first type of service having a higher reliability specification and a lower latency specification than a second type of service offered by the base station. The operations of 1805 may be performed according to the methods described herein. In some examples, aspects of the operations of 1805 may be performed by an uplink traffic component as described with reference to FIGS. 6 through 9.

At 1810, the UE may receive an RLF indication indicating that the radio uplink satisfies a failure condition for the first type of service. The operations of 1810 may be performed according to the methods described herein. In some examples, aspects of the operations of 1810 may be performed by an uplink RLF receiver as described with reference to FIGS. 6 through 9.

At 1815, the UE may transmit the uplink traffic for the first type of service via at least one new resource indicated to be activated by the RLF indication. The operations of 1815 may be performed according to the methods described herein. In some examples, aspects of the operations of 1815 may be performed by an uplink traffic transmitter as described with reference to FIGS. 6 through 9.

Figure 19:
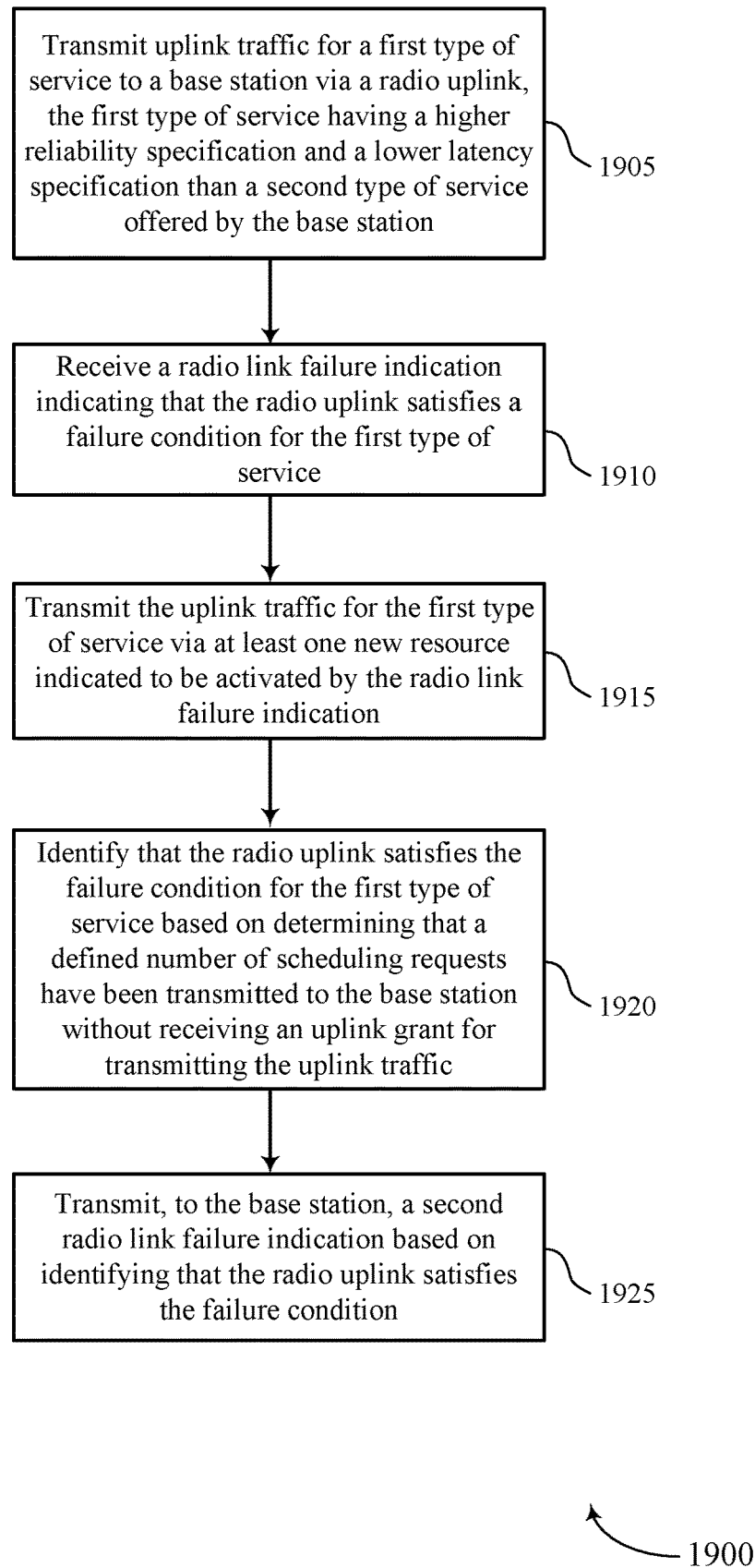

FIG. 19 shows a flowchart illustrating a method 1900 that supports RLM and RLF recovery in accordance with aspects of the present disclosure. The operations of method 1900 may be implemented by a UE 115 or its components as described herein. For example, the operations of method 1900 may be performed by a UE communications manager as described with reference to FIGS. 6 through 9. In some examples, a UE may execute a set of instructions to control the functional elements of the UE to perform the functions described herein. Additionally or alternatively, a UE may perform aspects of the functions described herein using special-purpose hardware.

At 1905, the UE may transmit uplink traffic for a first type of service to a base station via a radio uplink, the first type of service having a higher reliability specification and a lower latency specification than a second type of service offered by the base station. The operations of 1905 may be performed according to the methods described herein. In some examples, aspects of the operations of 1905 may be performed by an uplink traffic component as described with reference to FIGS. 6 through 9.

At 1910, the UE may receive an RLF indication indicating that the radio uplink satisfies a failure condition for the first type of service. The operations of 1910 may be performed according to the methods described herein. In some examples, aspects of the operations of 1910 may be performed by an uplink RLF receiver as described with reference to FIGS. 6 through 9.

At 1915, the UE may transmit the uplink traffic for the first type of service via at least one new resource indicated to be activated by the RLF indication. The operations of 1915 may be performed according to the methods described herein. In some examples, aspects of the operations of 1915 may be performed by an uplink traffic transmitter as described with reference to FIGS. 6 through 9.

At 1920, the UE may identify that the radio uplink satisfies the failure condition for the first type of service based on determining that a defined number of scheduling requests have been transmitted to the base station without receiving an uplink grant for transmitting the uplink traffic. The operations of 1920 may be performed according to the methods described herein. In some examples, aspects of the operations of 1920 may be performed by a SR uplink RLF component as described with reference to FIGS. 6 through 9.

At 1925, the UE may transmit, to the base station, a second RLF indication based on identifying that the radio uplink satisfies the failure condition. The operations of 1925 may be performed according to the methods described herein. In some examples, aspects of the operations of 1925 may be performed by a SR uplink RLF component as described with reference to FIGS. 6 through 9.

Figure 20:
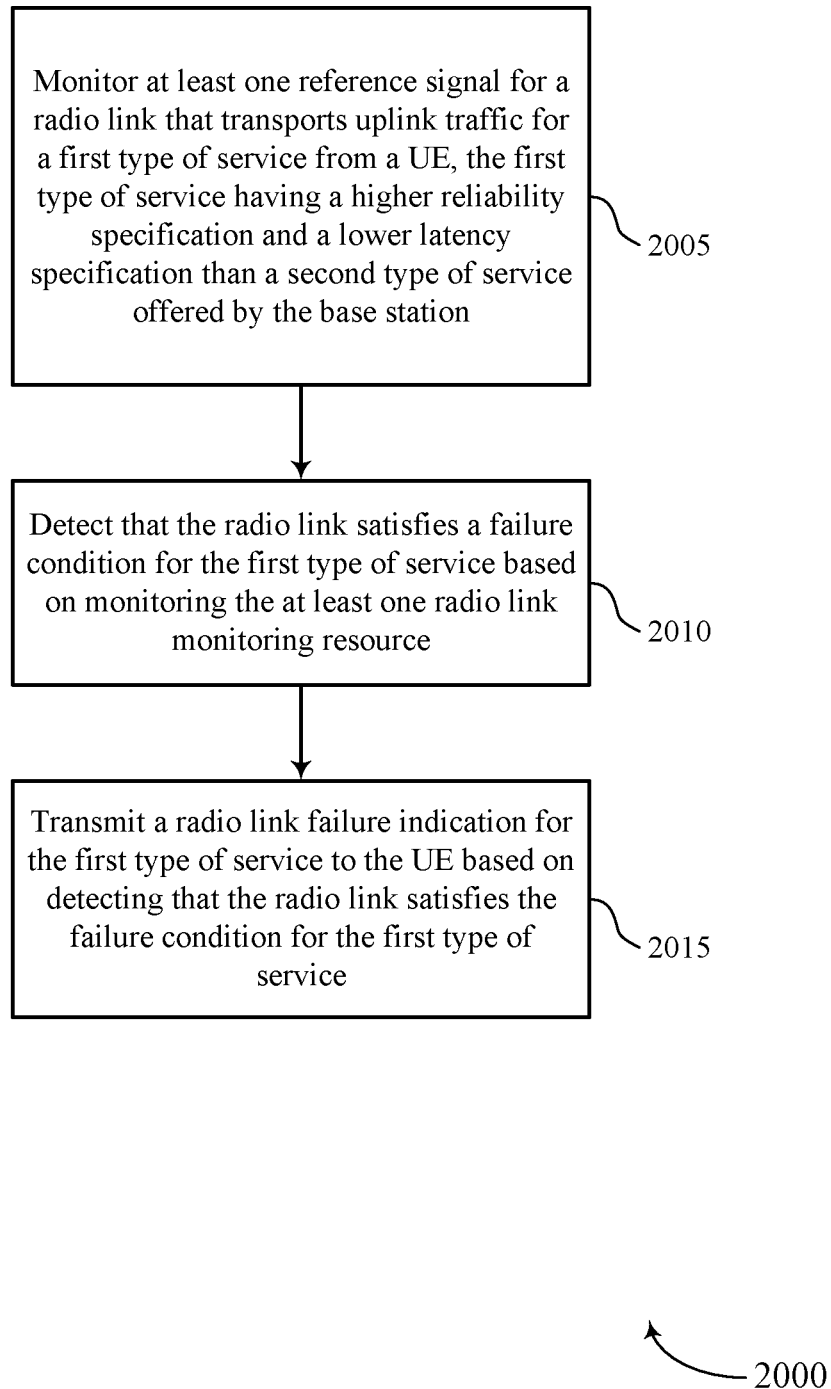

FIG. 20 shows a flowchart illustrating a method 2000 that supports RLM and RLF recovery in accordance with aspects of the present disclosure. The operations of method 2000 may be implemented by a base station 105 or its components as described herein. For example, the operations of method 2000 may be performed by a base station communications manager as described with reference to FIGS. 10 through 13. In some examples, a base station may execute a set of instructions to control the functional elements of the base station to perform the functions described herein. Additionally or alternatively, a base station may perform aspects of the functions described herein using special-purpose hardware.

At 2005, the base station may monitor at least reference signal for a radio link that transports uplink traffic for a first type of service from a UE, the first type of service having a higher reliability specification and a lower latency specification than a second type of service offered by the base station. The operations of 2005 may be performed according to the methods described herein. In some examples, aspects of the operations of 2005 may be performed by an uplink monitoring component as described with reference to FIGS. 10 through 13.

At 2010, the base station may detect that the radio link satisfies a failure condition for the first type of service based on monitoring the at least one reference signal. The operations of 2010 may be performed according to the methods described herein. In some examples, aspects of the operations of 2010 may be performed by an uplink RLF detector as described with reference to FIGS. 10 through 13.

At 2015, the base station may transmit an RLF indication for the first type of service to the UE based on detecting that the radio link satisfies the failure condition for the first type of service. The operations of 2015 may be performed according to the methods described herein. In some examples, aspects of the operations of 2015 may be performed by an uplink RLF transmitter as described with reference to FIGS. 10 through 13.

Embodiment 1

A method for wireless communication at a user equipment (UE), comprising: receiving, from a base station, a configuration of at least one radio link monitoring resource for a radio link that transports downlink traffic for a first type of service, the first type of service having a higher reliability specification and a lower latency specification than a second type of service offered by the base station; detecting that the radio link satisfies a failure condition for the first type of service based at least in part on monitoring the at least one radio link monitoring resource; and transmitting a radio link failure indication for the first type of service to the base station based at least in part on detecting that the radio link satisfies the failure condition for the first type of service.

Embodiment 2

The method of embodiment 1, further comprising: determining a target block error rate for an out of synchronization indication for a hypothetical physical downlink control channel (PDCCH) based at least in part on the configuration, wherein the radio link is detected to satisfy the failure condition for the first type of service based at least in part on the target block error rate.

Embodiment 3

The method of any of embodiments 1 to 2, further comprising: measuring a set of parameters of a reference signal communicated by the base station via the at least one radio link monitoring resource; and mapping the set of parameters to a block error rate.

Embodiment 4

The method of any of embodiments 3 to 4, wherein detecting that the radio link satisfies the failure condition for the first type of service further comprises: detecting that the radio link satisfies the failure condition for the first type of service based at least in part on the block error rate.

Embodiment 5

The method of embodiments 3 to 4, wherein the set of parameters comprise at least one of a block error rate parameter, a delay spread parameter, a Doppler parameter, a repetition factor parameter, a signal to noise ratio parameter, a signal to noise plus interference parameter, or any combination thereof.

Embodiment 6

The method of embodiments 3 to 5, wherein mapping the set of parameters to the block error rate further comprises: predicting a block error rate for a future hypothetical physical downlink control channel (PDCCH) transmission based at least in part on the set of parameters, wherein the radio link is detected to satisfy the failure condition for the first type of service based at least in part on the predicted block error rate.

Embodiment 7

The method of any of embodiments 1 to 6, further comprising: transmitting a new resource indication requesting a new resource for the radio link based at least in part on detecting that the radio link satisfies the failure condition for the first type of service and based at least in part on detecting that a quality parameter of the new resource satisfies a quality parameter target.

Embodiment 8

The method of embodiment 7, wherein the new resource indication indicates a carrier, a beam, a transmission/reception point, a repetition factor, a diversity order, or any combination thereof.

Embodiment 9

The method of any of embodiments 1 to 8, wherein the first type of service and the second type of service are provided by the base station or configured on a same component carrier, and wherein the monitoring the at least one radio link monitoring resource further comprises: monitoring the at least one radio link monitoring resource to determine a first parameter for the radio link for the first type of service; and monitoring the at least one radio link monitoring resource to determine a second parameter for the second type of service.

Embodiment 10

The method of any of embodiments 1 to 9, wherein the first type of service and the second type of service are provided by different base stations or configured on a different component carriers, and wherein monitoring the at least one radio link monitoring resource further comprises: monitoring the at least one radio link monitoring resource to determine a first set of parameters for the radio link for the first type of service; and monitoring a second radio link monitoring resource to determine a second parameter for a second radio link for the second type of service.

Embodiment 11

The method of any of embodiments 1 to 10, wherein detecting that the radio link satisfies the failure condition for the first type of service further comprises: determining a hypothetical block error rate for an autonomous downlink transmission or a semi-persistently scheduled downlink transmission via a physical downlink shared channel (PDSCH); identifying an out of synchronization indication based at least in part on the hypothetical block error rate; and detecting that the radio link satisfies the failure condition for the first type of service based at least in part on the out of synchronization indication.

Embodiment 12

The method of any of embodiments 1 to 11, further comprising: receiving a configuration message indicating a failure indication resource, wherein the radio link failure indication is transmitted via the failure indication resource.

Embodiment 13

The method of embodiment 12, wherein the failure indication resource is a dedicated physical random access channel, a scheduling request resource, a physical uplink control channel resource, or a combination thereof.

Embodiment 14

The method of embodiment 12, wherein transmitting the failure indication for the first type of service further comprises: transmitting, via a physical uplink shared channel (PUSCH) associated with the second type of service, a medium access control (MAC) control element comprising the radio link failure indication.

Embodiment 15

The method of embodiment 14, wherein the medium access control (MAC) control element indicates a request for a new resource for the radio link.

Embodiment 16

The method of any of embodiments 1 to 15, further comprising: receiving a configuration message indicating a plurality of failure indication resources, wherein transmitting the radio link failure indication further comprises: transmitting the radio link failure indication via a first failure indication resource of the plurality of failure indication resources to request a new resource for the radio link corresponding to the first failure indication resource.

Embodiment 17

The method of any of embodiments 1 to 16, wherein transmitting the radio link failure indication further comprises: transmitting an indicator that indicates a failure type for the radio link from a plurality of different failure types.

Embodiment 18

The method of any of embodiments 1 to 17, further comprising: transmitting an in-synchronization indication to indicate that the radio link no longer satisfies the failure condition for the first type of service.

Embodiment 19

The method of any of embodiments 1 to 18, further comprising: receiving a radio link failure response based at least in part on transmitting the radio link failure indication.

Embodiment 20

The method of embodiment 19, wherein the radio link failure response indicates a change to a carrier, a beam, a transmission/reception point, or any combination thereof, for the radio link.

Embodiment 21

The method of any of embodiments 19 to 20, wherein the radio link failure response configures or schedules the UE to use multiple carriers, multiple beams, multiple transmission/reception points, a repetition pattern, or any combination thereof.

Embodiment 22

The method of any of embodiments 19 to 21, wherein the radio link failure response indicates a change to a bandwidth parameter, a modulation and coding scheme, a repetition pattern parameter, a communication parameter, or any combination thereof, of a semi-persistently scheduled transmission associated with the first type of service.

Embodiment 23

The method of any of embodiments 19 to 22, wherein the radio link failure response is received in downlink control information signaling via a physical downlink control channel (PDCCH) associated with the second type of service or a medium access control (MAC) control element via a physical downlink shared channel (PDSCH) associated with the second type of service.

Embodiment 24

The method of any of embodiments 19 to 23, wherein the radio link failure response comprises a deactivation indicator indicating that the first type of service is deactivated.

Embodiment 25

The method of any of embodiments 1 to 24, further comprising: receiving traffic for the second type of service via the radio link.

Embodiment 26

The method of any of embodiments 1 to 25, further comprising: detecting that the radio link does not satisfy a second failure condition for the second type of service within a time period in which the radio link satisfies the failure condition for the first type of service.

Embodiment 27

The method of any of embodiments 1 to 26, wherein the at least one radio link monitoring resource is a carrier, a beam, a transmission/reception point, or any combination thereof.

Embodiment 28

The method of any of embodiments 1 to 27, wherein the first type of service is an ultra-reliable low latency service and the second type of service is an enhanced mobile broadband service.

Embodiment 29

The method of any of embodiments 1 to 28, wherein a first monitoring periodicity of the at least one radio link monitoring resource associated with the first type of service is shorter than a second monitoring periodicity of a radio link monitoring resource associated with the second type of service.

Embodiment 30

A method for wireless communication at a base station, comprising: transmitting, to a user equipment (UE), a configuration of at least one radio link monitoring resource for a radio link that transports downlink traffic for a first type of service, the first type of service having a higher reliability specification and a lower latency specification than a second type of service offered by the base station; receiving a radio link failure indication from the UE indicating that the radio link satisfies a failure condition for the first type of service; and transmitting a radio link failure response to the UE based at least in part on the radio link failure indication.

Embodiment 31

The method of embodiment 30, further comprising: transmitting a configuration message indicating a failure indication resource, wherein the radio link failure indication is received via the failure indication resource.

Embodiment 32

The method of embodiment 31, wherein the failure indication resource is a dedicated physical random access channel, a scheduling request resource, a physical uplink control channel resource, or a combination thereof.

Embodiment 33

The method of any of embodiments 30 to 31, wherein receiving the radio link failure indication further comprises:

receiving, via a physical uplink shared channel (PUSCH) of the second type of service, a medium access control (MAC) control element comprising the radio link failure indication.

Embodiment 34

The method of embodiment 33, wherein the medium access control (MAC) control element indicates a request for a new resource for the radio link.

Embodiment 35

The method of any of embodiments 30 to 35, further comprising: receiving a new resource indication requesting a new resource for the radio link; and determining the new resource indicated in the new resource indication.

Embodiment 36

The method of embodiment 35, wherein the new resource indication indicates a carrier, or a beam, a transmission/reception point, or any combination thereof.

Embodiment 37

The method of any of embodiments 30 to 36, further comprising: transmitting a configuration message indicating a plurality of failure indication resources, wherein receiving the radio link failure indication further comprises; and receiving the radio link failure indication via a first failure indication resource of the plurality of failure indication resources for requesting a new resource for the radio link corresponding to the first failure indication resource.

Embodiment 38

The method of any of embodiments 30 to 37, wherein receiving the radio link failure indication further comprises: receiving an indicator that indicates a failure type for the radio link from a plurality of different failure types.

Embodiment 39

The method of any of embodiments 30 to 38, further comprising: receiving an in-synchronization indication to indicate that the radio link no longer satisfies the failure condition for the first type of service.

Embodiment 40

The method of any of embodiments 30 to 39, wherein the radio link failure response indicates a change to a carrier, a beam, a transmission/reception point, or any combination thereof, for the radio link.

Embodiment 41

The method of any of embodiments 30 to 40, wherein the radio link failure response indicates a change to a bandwidth parameter, a modulation and coding scheme, a repetition pattern parameter, a communication parameter, or any combination thereof, of a semi-persistently scheduled transmission associated with the first type of service.

Embodiment 42

The method of any of embodiments 30 to 41, wherein the radio link failure response configures or schedules the UE to use multiple carriers, multiple beams, multiple transmission/reception points, a repetition pattern, or any combination thereof.

Embodiment 43

The method of any of embodiments 30 to 42, wherein the radio link failure response is transmitted in downlink control information signaling or a medium access control (MAC) control element.

Embodiment 44

The method of any of embodiments 30 to 43, wherein the radio link failure response comprises a deactivation indicator indicating that the first type of service is deactivated.

Embodiment 45

The method of any of embodiments 30 to 44, further comprising: transmitting downlink control information associated with the first type of service via the at least one radio link monitoring resource.

Embodiment 46

The method of any of embodiments 30 to 45, wherein the first type of service is an ultra-reliable low latency service and the second type of service is an enhanced mobile broadband service.

Embodiment 47

The method of any of embodiments 30 to 46, wherein a first monitoring periodicity of the at least one radio link monitoring resource associated with the first type of service is shorter than a second monitoring periodicity of a radio link monitoring resource associated with the second type of service.

Embodiment 48

A method for wireless communication at a user equipment (UE), comprising: transmitting uplink traffic for a first type of service to a base station via a radio uplink, the first type of service having a higher reliability specification and a lower latency specification than a second type of service offered by the base station; receiving a radio link failure indication indicating that the radio uplink satisfies a failure condition for the first type of service; and transmitting the uplink traffic for the first type of service via at least one new resource indicated to be activated by the radio link failure indication.

Embodiment 49

The method of embodiment 48, further comprising: identifying that the radio uplink satisfies the failure condition for the first type of service based at least in part on determining that a defined number of scheduling requests have been transmitted to the base station without receiving an uplink grant for transmitting the uplink traffic; and transmitting, to the base station, a second radio link failure indication based at least in part on identifying that the radio uplink satisfies the failure condition.

Embodiment 50

The method of any of embodiments 48 to 49, further comprising: receiving, from the base station, a configuration of at least one reference signal for the radio uplink.

Embodiment 51

The method of any of embodiments 48 to 50, further comprising: transmitting a second reference signal to the base station.

Embodiment 52

The method of any of embodiments 48 to 51, wherein the radio link failure indication is received in downlink control information signaling via a physical downlink control channel (PDCCH) or a medium access control (MAC) control element via a physical downlink shared channel (PDSCH).

Embodiment 53

The method of any of embodiments 48 to 52, wherein the radio link failure indication indicates at least one parameter.

Embodiment 54

The method of any of embodiments 48 to 53, further comprising: jointly decoding the radio link failure indication to obtain at least one parameter and a transmit power command.

Embodiment 55

The method of any of embodiments 48 to 54, wherein the at least one new resource is an additional resource for a scheduling request, a repetition factor for an uplink control channel, a dedicated resource for uplink control channel repetition, or any combination thereof.

Embodiment 56

The method of any of embodiments 48 to 55, wherein the first type of service is an ultra-reliable low latency service and the second type of service is an enhanced mobile broadband service.

Embodiment 57

A method for wireless communication at a base station, comprising: monitoring at least one reference signal for a radio link that transports uplink traffic for a first type of service from a user equipment (UE), the first type of service having a higher reliability specification and a lower latency specification than a second type of service offered by the base station; detecting that the radio uplink satisfies a failure condition for the first type of service based at least in part on monitoring the at least one reference signal; and transmitting a radio link failure indication for the first type of service to the UE based at least in part on detecting that the radio link satisfies the failure condition for the first type of service.

Embodiment 58

The method of embodiment 57, wherein detecting that the radio link satisfies the failure condition for the first type of service further comprises: measuring a parameter of a reference signal communicated by the UE, wherein the radio link is detected to satisfy the failure condition for the first type of service based at least in part on a block error rate.

Embodiment 59

The method of embodiment 58, wherein the measured parameter is a signal to noise ratio or a signal to interference plus noise ratio.

Embodiment 60

The method of any of embodiments to 57 to 59, wherein the radio link failure indication is transmitted in downlink control information signaling via a physical downlink control channel (PDCCH) or a medium access control (MAC) control element via a physical downlink shared channel (PDSCH).

Embodiment 61

The method of any of embodiments 57 to 59, wherein the radio link failure indication indicates at least one parameter.

Embodiment 62

The method of any of embodiments 57 to 61, further comprising: generating the radio link failure indication based at least in part on jointly encoding at least one parameter with a transmit power command.

Embodiment 63

The method of any of embodiments 57 to 62, wherein the radio link failure indication indicates activation of at least one resource.

Embodiment 64

The method of embodiment 63, wherein the at least one resource is an additional resource for a scheduling request, a change to a repetition factor for an uplink control channel, a dedicated uplink resource with repetition, or any combination thereof.

Embodiment 65

The method of any of embodiments 57 to 64, wherein the first type of service is a ultra-reliable low latency service and the second type of service is an enhanced mobile broadband service.

Embodiment 66

The method of any of embodiments 57 to 65, wherein a first monitoring periodicity of the at least one reference signal associated with the first type of service is shorter than a second monitoring periodicity of a reference signal associated with the second type of service.

Embodiment 67

An apparatus comprising at least one means for performing a method of any of embodiments 1 to 29.

Embodiment 68

An apparatus comprising at least one means for performing a method of any of embodiments 30 to 47.

Embodiment 69

An apparatus comprising at least one means for performing a method of any of embodiments 48 to 56.

Embodiment 70

An apparatus comprising at least one means for performing a method of any of embodiments 57 to 66.

Embodiment 71

An apparatus for wireless communications comprising a processor; memory in electronic communication with the processor; and instructions stored in the memory and executable by the processor to cause the apparatus to perform a method of any of embodiments 1 to 29.

Embodiment 72

An apparatus for wireless communications comprising a processor; memory in electronic communication with the processor; and instructions stored in the memory and executable by the processor to cause the apparatus to perform a method of any of embodiments 30 to 47.

Embodiment 73

An apparatus for wireless communications comprising a processor; memory in electronic communication with the processor; and instructions stored in the memory and executable by the processor to cause the apparatus to perform a method of any of embodiments 48 to 56.

Embodiment 74

An apparatus for wireless communications comprising a processor; memory in electronic communication with the processor; and instructions stored in the memory and executable by the processor to cause the apparatus to perform a method of any of embodiments 57 to 66.

Embodiment 75

A non-transitory computer-readable medium storing code for wireless communications, the code comprising instructions executable by a processor to perform a method of any of embodiments 1 to 29.

Embodiment 76

A non-transitory computer-readable medium storing code for wireless communications, the code comprising instructions executable by a processor to perform a method of any of embodiments 30 to 47.

Embodiment 75

A non-transitory computer-readable medium storing code for wireless communications, the code comprising instructions executable by a processor to perform a method of any of embodiments 48 to 56.

Embodiment 76

A non-transitory computer-readable medium storing code for wireless communications, the code comprising instructions executable by a processor to perform a method of any of embodiments 57 to 66.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
 receiving, from a base station, a configuration of at least one radio link monitoring resource for a radio link that transports downlink traffic for a first type of service, the first type of service having a higher reliability specification and a lower latency specification than a second type of service offered by the base station;

detecting that the radio link satisfies a failure condition for the first type of service based at least in part on monitoring the at least one radio link monitoring resource;

transmitting a radio link failure indication for the first type of service to the base station based at least in part on detecting that the radio link satisfies the failure condition for the first type of service;

receiving, from the base station, a radio link failure response indicating a change to a communication parameter of the radio link for the first type of service via a control channel or a data channel associated with the second type of service based at least in part on transmitting the radio link failure indication; and monitoring the radio link for subsequent downlink traffic of the first type of service based at least in part on the changed communication parameter.

2. The method of claim 1, further comprising:
determining a target block error rate for an out of synchronization indication for a hypothetical physical downlink control channel (PDCCH) based at least in part on the configuration, wherein the radio link is detected to satisfy the failure condition for the first type of service based at least in part on the target block error rate.

3. The method of claim 1, further comprising:
measuring a set of parameters of a reference signal communicated by the base station via the at least one radio link monitoring resource; and
mapping the set of parameters to a block error rate.

4. The method of claim 3, wherein detecting that the radio link satisfies the failure condition for the first type of service further comprises:
detecting that the radio link satisfies the failure condition for the first type of service based at least in part on the block error rate.

5. The method of claim 3, wherein the set of parameters comprise at least one of a block error rate parameter, a delay spread parameter, a Doppler parameter, a repetition factor parameter, a signal to noise ratio parameter, a signal to noise plus interference parameter, or any combination thereof.

6. The method of claim 3, wherein mapping the set of parameters to the block error rate further comprises:
predicting the block error rate for a future hypothetical physical downlink control channel (PDCCH) transmission based at least in part on the set of parameters, wherein the radio link is detected to satisfy the failure condition for the first type of service based at least in part on the predicted block error rate.

7. The method of claim 1, further comprising:
transmitting a new resource indication requesting a new resource for the radio link based at least in part on detecting that the radio link satisfies the failure condition for the first type of service and based at least in part on detecting that a quality parameter of the new resource satisfies a quality parameter target.

8. The method of claim 7, wherein the new resource indication indicates a carrier, a beam, a transmission/reception point, a repetition factor, a diversity order, or any combination thereof.

9. The method of claim 1, wherein the first type of service and the second type of service are provided by the base station or configured on a same component carrier, and wherein the monitoring the at least one radio link monitoring resource further comprises:

monitoring the at least one radio link monitoring resource to determine a first parameter for the radio link for the first type of service; and monitoring the at least one radio link monitoring resource to determine a second parameter for the second type of service.

10. The method of claim 1, wherein the first type of service and the second type of service are provided by different base stations or configured on a different component carriers, and wherein monitoring the at least one radio link monitoring resource further comprises:

monitoring the at least one radio link monitoring resource to determine a first set of parameters for the radio link for the first type of service; and monitoring a second radio link monitoring resource to determine a second parameter for a second radio link for the second type of service.

11. The method of claim 1, wherein detecting that the radio link satisfies the failure condition for the first type of service further comprises:
determining a hypothetical block error rate for an autonomous downlink transmission or a semi-persistently scheduled downlink transmission via a physical downlink shared channel (PDSCH);
identifying an out of synchronization indication based at least in part on the hypothetical block error rate; and
detecting that the radio link satisfies the failure condition for the first type of service based at least in part on the out of synchronization indication.

12. The method of claim 1, further comprising:
receiving a configuration message indicating a failure indication resource, wherein the radio link failure indication is transmitted via the failure indication resource.

13. The method of claim 12, wherein the failure indication resource is a dedicated physical random access channel, a scheduling request resource, a physical uplink control channel resource, or a combination thereof.

14. The method of claim 12, wherein transmitting the failure indication for the first type of service further comprises:
transmitting, via a physical uplink shared channel (PUSCH) associated with the second type of service, a medium access control (MAC) control element comprising the radio link failure indication.

15. The method of claim 1, further comprising:
receiving a configuration message indicating a plurality of failure indication resources, wherein transmitting the radio link failure indication further comprises:
transmitting the radio link failure indication via a first failure indication resource of the plurality of failure indication resources to request a new resource for the radio link corresponding to the first failure indication resource.

16. The method of claim 1, wherein transmitting the radio link failure indication further comprises:
transmitting an indicator that indicates a failure type for the radio link from a plurality of different failure types.

17. The method of claim 1, further comprising:
transmitting an in-synchronization indication to indicate that the radio link no longer satisfies the failure condition for the first type of service.

18. The method of claim 1, wherein the change to the communication parameter indicates a change to a carrier, a beam, a transmission/reception point, or any combination thereof, for the radio link.

19. The method of claim 1, wherein the radio link failure response is received in downlink control information signaling via a physical downlink control channel (PDCCH) associated with the second type of service or a medium access control (MAC) control element via a physical downlink shared channel (PDSCH) associated with the second type of service.

20. The method of claim 1, further comprising:
detecting that the radio link does not satisfy a second failure condition for the second type of service within a time period in which the radio link satisfies the failure condition for the first type of service.

21. The method of claim 1, wherein the first type of service is an ultra-reliable low latency service and the second type of service is an enhanced mobile broadband service.

22. The method of claim 1, wherein a first monitoring periodicity of the at least one radio link monitoring resource associated with the first type of service is shorter than a second monitoring periodicity of a radio link monitoring resource associated with the second type of service.

23. A method for wireless communication at a base station, comprising:
transmitting, to a user equipment (UE), a configuration of at least one radio link monitoring resource for a radio link that transports downlink traffic for a first type of service, the first type of service having a higher reliability specification and a lower latency specification than a second type of service offered by the base station;
receiving a radio link failure indication from the UE indicating that the radio link satisfies a failure condition for the first type of service;
transmitting, to the UE, a radio link failure response to the UE indicating a change to a communication parameter of the radio link for the first type of service via a control channel or a data channel associated with the second type of service based at least in part on the radio link failure indication; and
transmitting, via the radio link for the first type of service, subsequent downlink traffic of the first type of service based at least in part on the changed communication parameter.

24. A method for wireless communication at a user equipment (UE), comprising:
transmitting uplink traffic for a first type of service to a base station via a radio uplink, the first type of service having a higher reliability specification and a lower latency specification than a second type of service offered by the base station;
receiving, from the base station, a radio link failure indication indicating that the radio uplink satisfies a failure condition for the first type of service and indicating a change to a communication parameter of the radio link for the first type or service via a control channel or a data channel associated with the second type of service;

transmitting the uplink traffic for the first type of service via at least one new resource indicated to be activated by the radio link failure indication; and
monitoring the radio link for subsequent downlink traffic of the first type of service based at least in part on the changed communication parameter.

25. The method of claim 24, further comprising:
identifying that the radio uplink satisfies the failure condition for the first type of service based at least in part on determining that a defined number of scheduling requests have been transmitted to the base station without receiving an uplink grant for transmitting the uplink traffic; and
transmitting, to the base station, a second radio link failure indication based at least in part on identifying that the radio uplink satisfies the failure condition.

26. The method of claim 24, wherein the radio link failure indication is received in downlink control information signaling via a physical downlink control channel (PDCCH) or a medium access control (MAC) control element via a physical downlink shared channel (PDSCH).

27. The method of claim 24, further comprising:
jointly decoding the radio link failure indication to obtain at least one parameter and a transmit power command.

28. The method of claim 24, wherein the first type of service is an ultra-reliable low latency service and the second type of service is an enhanced mobile broadband service.

29. A method for wireless communication at a base station, comprising:
monitoring at least one reference signal for a radio link that transports uplink traffic for a first type of service from a user equipment (UE), the first type of service having a higher reliability specification and a lower latency specification than a second type of service offered by the base station;
detecting that the radio uplink satisfies a failure condition for the first type of service based at least in part on monitoring the at least one reference signal;
transmitting, to the UE, a radio link failure indication for the first type of service to the UE based at least in part on detecting that the radio link satisfies the failure condition for the first type of service, the radio link failure indication indicating a change to a communication parameter of the radio link for the first type of service via a control channel or a data channel associated with the second type of service; and
transmitting, via the radio link for the first type of service, subsequent downlink traffic of the first type of service based at least in part on the changed communication parameter.

* * * * *